United States Patent
Schoenauer et al.

(10) Patent No.: US 10,036,437 B2
(45) Date of Patent: Jul. 31, 2018

(54) DISC BRAKE AND SET OF BRAKE PADS

(71) Applicant: Bendix Spicer Foundation Brake LLC, Elyria, OH (US)

(72) Inventors: Manfred Schoenauer, Munich (DE); Wolfgang Pahle, Bad Wiessee (DE); Markus Bartel, Munich (DE); Tobias Fischl, Munich (DE); Johann Baumgartner, Moosburg (DE); Andreas Petschke, Passau (DE); Richard L. Lantz, Clinton, OH (US); Robert Tekesky, Elyria, OH (US); Markus Bohmann, Neufahrn bei Freising (DE)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 14 days.

(21) Appl. No.: 14/939,748

(22) Filed: Nov. 12, 2015

(65) Prior Publication Data
US 2017/0138427 A1 May 18, 2017

(51) Int. Cl.
*F16D 65/097* (2006.01)
*F16D 55/226* (2006.01)
*F16D 65/02* (2006.01)

(52) U.S. Cl.
CPC ....... *F16D 65/0978* (2013.01); *F16D 55/226* (2013.01); *F16D 2065/026* (2013.01)

(58) Field of Classification Search
CPC . F16D 65/0978; F16D 65/0974; F16D 55/226
USPC ...................................................... 188/73.38
See application file for complete search history.

(56) References Cited

U.S. PATENT DOCUMENTS

| 4,214,649 | A | 7/1980 | Fujimori et al. |
| 4,699,255 | A | 10/1987 | Claverie |
| 5,875,873 | A | 3/1999 | Kay et al. |
| 5,947,234 | A | 9/1999 | Shimazaki |
| 7,458,447 | B2* | 12/2008 | Thomas ............... F16D 55/226 188/205 A |
| 7,837,015 | B2* | 11/2010 | Klement ............ F16D 65/0977 188/73.35 |

(Continued)

FOREIGN PATENT DOCUMENTS

| DE | 20 2008 013 446 U1 | 4/2009 |
| DE | 10 2012 002 734 A1 | 8/2013 |

(Continued)

OTHER PUBLICATIONS

International Search Report (PCT/ISA/220 and PCT/ISA/210) issued in PCT Application No. PCT/US2016/061124 dated Jan. 6, 2017 (three pages).
Written Opinion (PCT/ISA/237) issued in PCT Application No. PCT/US2016/061124 dated Jan. 6, 2017 (nine pages).

*Primary Examiner* — Thomas W Irvin
(74) *Attorney, Agent, or Firm* — Crowell & Moring LLP

(57) ABSTRACT

A disc brake for a vehicle, in particular for a commercial vehicle, is provided. The disc brake includes at least one application-side brake pad and a back-side brake pad held in a form-fitting manner in a brake carrier. At least the application-side brake pad is provided with at least one pad-retaining spring which is supported at least on one brake carrier horn of the brake carrier and exerts a radially outwardly acting tensile force on the brake pad.

32 Claims, 16 Drawing Sheets

(56) References Cited

U.S. PATENT DOCUMENTS

| | | | |
|---|---|---|---|
| 8,215,458 B2* | 7/2012 | Wolf | F16D 65/0978 |
| | | | 188/73.36 |
| 8,220,595 B2* | 7/2012 | Camilo-Martinez | F16D 65/0978 |
| | | | 188/250 B |
| 8,496,093 B2* | 7/2013 | Kreuzeder | F16D 65/0976 |
| | | | 188/1.11 L |
| 8,540,061 B1 | 9/2013 | Plantan et al. | |
| 8,662,261 B2* | 3/2014 | Raffin | F16D 65/0978 |
| | | | 188/1.11 W |
| 9,599,176 B2* | 3/2017 | Baumgartner | F16D 55/226 |
| 9,657,793 B2* | 5/2017 | Sander | F16D 65/0976 |
| 2004/0168868 A1* | 9/2004 | Thomas | F16D 65/0977 |
| | | | 188/73.37 |
| 2006/0054425 A1 | 3/2006 | Maehara | |
| 2007/0240946 A1 | 10/2007 | Schorn et al. | |
| 2009/0211857 A1 | 8/2009 | Camilo-Martinez et al. | |
| 2014/0209420 A1* | 7/2014 | Jaeger | F16D 55/22 |
| | | | 188/72.1 |
| 2014/0345983 A1* | 11/2014 | Baumgartner | F16D 55/02 |
| | | | 188/73.31 |
| 2017/0138425 A1* | 5/2017 | Schropp | F16D 65/0974 |
| 2017/0138426 A1* | 5/2017 | Schoenauer | F16D 65/0978 |

FOREIGN PATENT DOCUMENTS

| | | |
|---|---|---|
| WO | WO 01/33096 A1 | 5/2001 |
| WO | WO 2013/143993 A1 | 10/2013 |

* cited by examiner

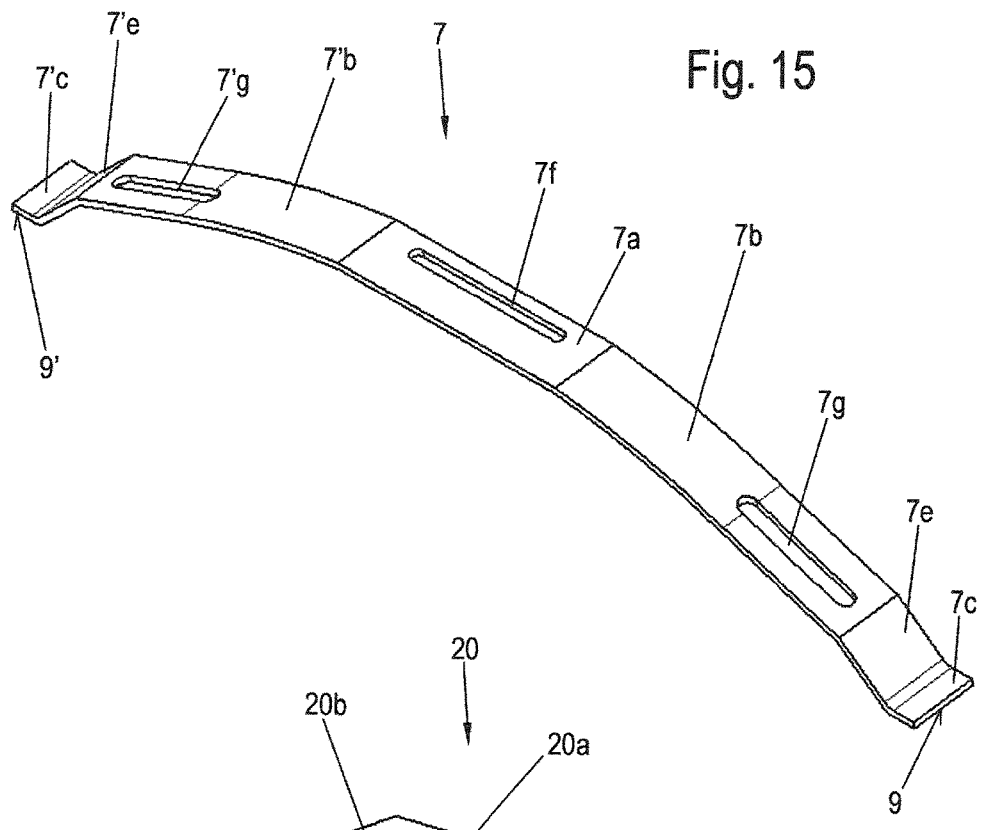

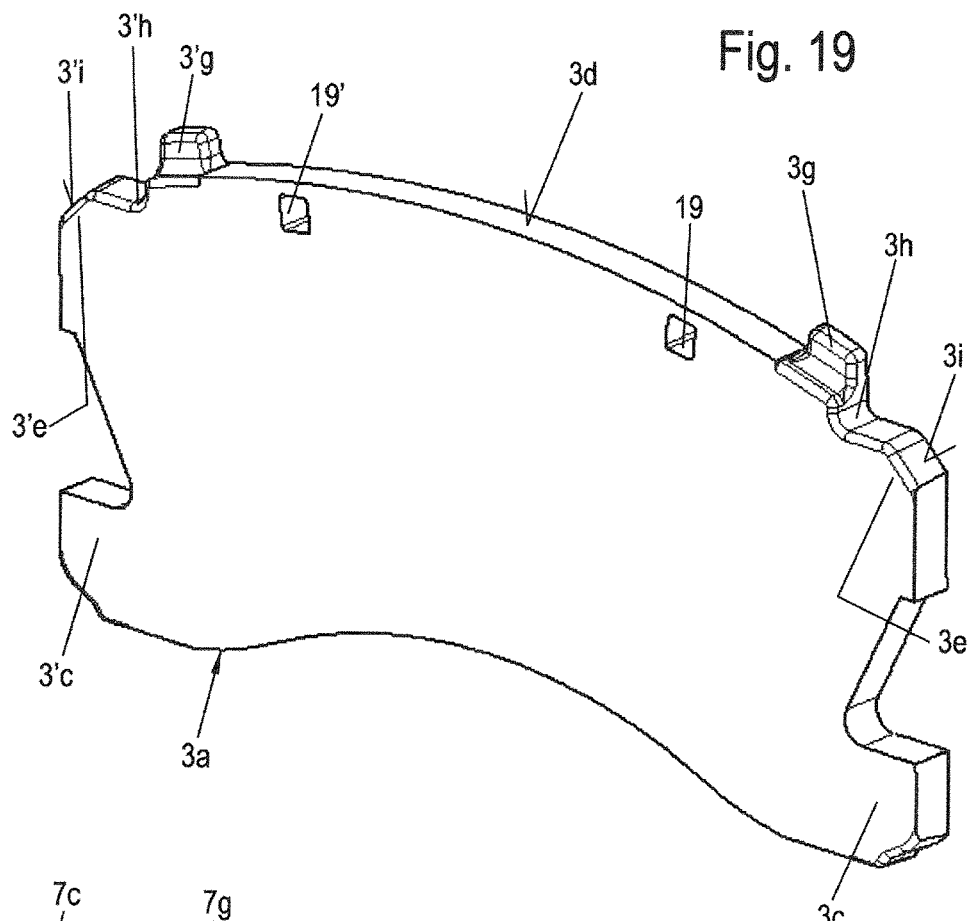
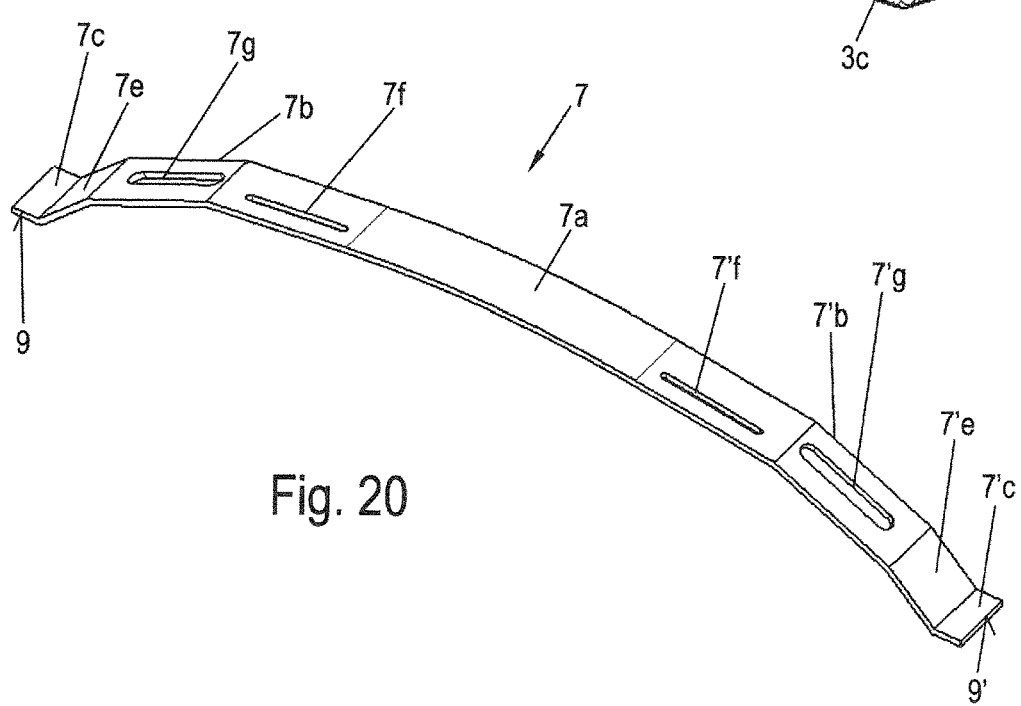

DISC BRAKE AND SET OF BRAKE PADS

The present invention relates to a disc brake and to a set of brake pads for a disc brake, and in particular to brake pad retaining device arrangements.

Disc brakes of this type are used in particular in commercial vehicles and are frequently provided with pneumatic actuation. One embodiment of the brake caliper of disc brakes of this type is in the form of a sliding caliper and is used, for example, in a tight construction space in the vicinity of an adjacent wheel rim.

A sliding brake caliper is customarily connected to a supporting brake carrier via two bearing struts which are designed as fixed and movable bearings. The brake pads of the disc brake are guided displaceably in the brake carrier and are typically held in a spring-loaded manner in pad slots in the brake carrier by a pad-retaining clip.

In the case of disc brakes, in particular in the case of disc brakes with only one force introduction element, the design may induce an uneven wear of the brake pads. The brake pads may not wear in parallel either in the radial direction or in the circumferential direction with respect to a plane of the pad carrier plates thereof, which is referred to as radial or tangential wear.

An example of a spring-loaded pad-retaining clip is described in German Utility Patent No. DE 20 2008 013 446 U1.

The documents International Patent Publication No. WO 2013/143993 A1, German Patent Publication No. DE 10 2012 002 734 A1 and U.S. Pat. No. 8,540,061 B1 illustrate brake pad retaining systems.

Against the background of these solutions, there continues to be a constant requirement for an extended service life of brakes and brake components with a simultaneous reduction in costs.

The invention is therefore based on the object of providing an improved disc brake.

It is a further object to provide an improved set of brake pads for a disc brake.

The invention achieves the first object by providing a disc brake in which the application-side brake pad has at least one associated pad-retaining spring supported on at least one brake carrier horn a brake carrier and exerting a radially outwardly acting tensile force on the brake pad.

The further object is achieved by providing a set of brake pads for such a disc brake for a vehicle, in which the application-side brake pad has at least one pad-retaining spring with at least one pressure section that protrudes laterally over one end of the application-side brake pad's back plate.

Accordingly, a disc brake for a vehicle, in particular for a commercial vehicle, includes a brake disc with a brake disc rotational axis, at least one application-side brake pad and a back-side (also known as reaction-side) brake pad, a brake carrier which accommodates the at least two brake pads in a respective pad slot, wherein the at least one application-side brake pad is held in a form-fitting manner in the associated pad slot, and a brake caliper which straddles the brake disc and is designed as a sliding caliper. The application-side brake pad is provided with at least one pad-retaining spring which is supported at least on one brake carrier horn of the pad slot of the brake carrier and exerts a radially outwardly acting tensile force on the brake pad.

The radially outwardly acting tensile force makes it possible for the brake pad to be pulled into the form-fitting holder thereof, as a result of which a reduction in oblique wear is advantageously made possible.

The production of the tensile force is possible by an advantageously simple arrangement with at least one pad-retaining spring which is supported on a brake carrier horn of the pad slot after the brake pad has been fitted.

In one embodiment, the at least one application-side brake pad is in engagement in a form-fitting manner via a pad back plate with contours of brake carrier horns in the pad slot of the brake carrier. Fixing of the application-side brake pad in both radial directions with respect to the brake disc rotational axis is therefore advantageously made possible.

For this purpose, in a further embodiment, it is provided that the contours of the brake carrier horns correspond with contours of the pad back plate, wherein undercut surfaces of the contours of the brake carrier horns are in each case in engagement in a play-free manner with undercut surfaces of projections of the pad back plate.

In a further embodiment, the at least one pad-retaining spring is attached to the pad back plate. A compact brake pad is therefore created.

The at least one pad-retaining spring can be attached here on an upper side of the pad back plate, which permits a saving on space.

In yet another embodiment, the at least one pad-retaining spring comprises a central section; arms; pressure sections and transition sections, wherein the central section is attached on the upper side of the pad back plate, wherein the transition sections bear on the upper side of the pad back plate, and the pressure sections at one end in each case of the upper side of the pad back plate protrude laterally from the pad back plate. Effective and simple pretensioning of the pad-retaining spring can thus be produced. The pad-retaining spring can be, for example, a flat spring steel, from which said pad-retaining spring is produced as a punched and bent part.

In an alternative embodiment, the at least one pad-retaining spring comprises a central section; arms; pressure sections and intermediate sections, wherein the central section is attached by at least one fastening element to the pad back plate, wherein the pressure sections at one end in each case of the upper side of the pad back plate protrude laterally from the pad back plate. It is therefore made advantageously possible to use existing fastening elements without or only with minor amendments.

For this purpose, the at least one fastening element can be of clamp-like design and have a transverse section which, in the mounted state of the pad-retaining spring, extends through an opening in the pad back plate, wherein the pad-retaining spring is arranged between the at least one fastening element and an upper side of the pad back plate. This is advantageous since the pad-retaining spring is thereby attached captively to the pad back plate of the brake pad. A further advantage here is a clearance of the central part of the pad-retaining spring between the fastening element and the pad back plate, as a result of which uniform loading of the pad-retaining spring can be achieved.

In a further embodiment, the pad-retaining spring has at least one slit through which a section of the at least one fastening element extends. For example, existing punching tools can thus be used for slits of pad-retaining springs. In addition, it is possible for pad-retaining spring and fastening element to be kept captively together.

In yet another embodiment, the pad-retaining spring has at least one further slit through which a guide projection of the pad back plate extends. In this manner, the pad-retaining spring can advantageously be kept centered on the upper side of the pad back plate and can be guided in the possible longitudinal movements thereof in such a manner that a contact connection of the pressure sections with the brake carrier horns remains ensured.

If at least one of the pressure sections is supported on the at least one brake carrier horn of the pad slot of the brake carrier, an advantageously simple tensile force is produced on the brake pad, with no additional measures being required at the brake carrier.

In an alternative embodiment, the at least one pad-retaining spring is attached on an upper side of the pad back plate by at least one spring holder. An advantageous saving on weight is therefore made possible.

In a further embodiment, the at least one spring holder has at least one retaining element, wherein the at least one pad-retaining spring is arranged and held in a pretensioned manner between the at least one retaining element and the upper side of the pad back plate. This results in a simple production of pretensioning.

In yet another embodiment, the at least one pad-retaining spring comprises at least one central section, transition sections, at least one pressure section and at least one bearing section.

In a further embodiment, the at least one bearing section rests on the upper side of the pad back plate, and the at least one pressure section protrudes laterally from the pad back plate at an end of the upper side of the pad back plate. This results in an advantageously compact design.

For advantageously simple production of a tensile force which acts on the brake pad, the at least one pressure section is supported on the at least one brake carrier horn of the pad slot of the brake carrier.

In a further embodiment, the at least one retaining element is designed as a roller, in particular cable roller. A roller design of this type has the advantage of laterally guiding the pad-retaining spring.

In a preferred embodiment, it is provided that the at least one pad-retaining spring is produced from a spring wire. The pad-retaining spring is therefore simple to produce.

A further preferred embodiment provides two such pad-retaining springs at each end of the upper side of the pad back plate. This results in improved production of tensile force.

A set of brake pads for an above-described disc brake for a vehicle, in particular for a commercial vehicle, comprises the at least one application-side brake pad and at least one back-side brake pad. The application-side brake pad has at least one pad-retaining spring with at least one pressure section, wherein the at least one pressure section protrudes laterally over one end of an upper side of a pad back plate of the application-side brake pads.

Other objects, advantages and novel features of the present invention will become apparent from the following detailed description of the invention when considered in conjunction with the accompanying drawings.

BRIEF DESCRIPTION OF THE DRAWINGS

FIG. 15 shows a perspective view of a pad-retaining spring of the embodiment according to FIGS. 12-13;

FIG. 16 shows a perspective view of a fastening element of the pad-retaining spring according to FIG. 15;

FIG. 19 shows a perspective view of a pad back plate of a brake pad of the fourth embodiment;

FIG. 20 shows a perspective view of a pad-retaining spring of the embodiment according to FIGS. 17-18.

Disc brakes of this type are used in particular in commercial vehicles and are frequently pneumatically-actuated. One embodiment of the brake caliper of disc brakes of this type is in the form of a sliding caliper and is used, for example, in a constricted construction space in the vicinity of an adjacent wheel rim.

Terms such as "top", "bottom", "right", "left", etc., relate to orientations and arrangements in the figures.

DETAILED DESCRIPTION

Disc brakes of this type are used in particular in commercial vehicles and are frequently pneumatically-actuated. One embodiment of the brake caliper of disc brakes of this type is in the form of a sliding caliper and is used, for example, in a constricted construction space in the vicinity of an adjacent wheel rim.

Figure 1:
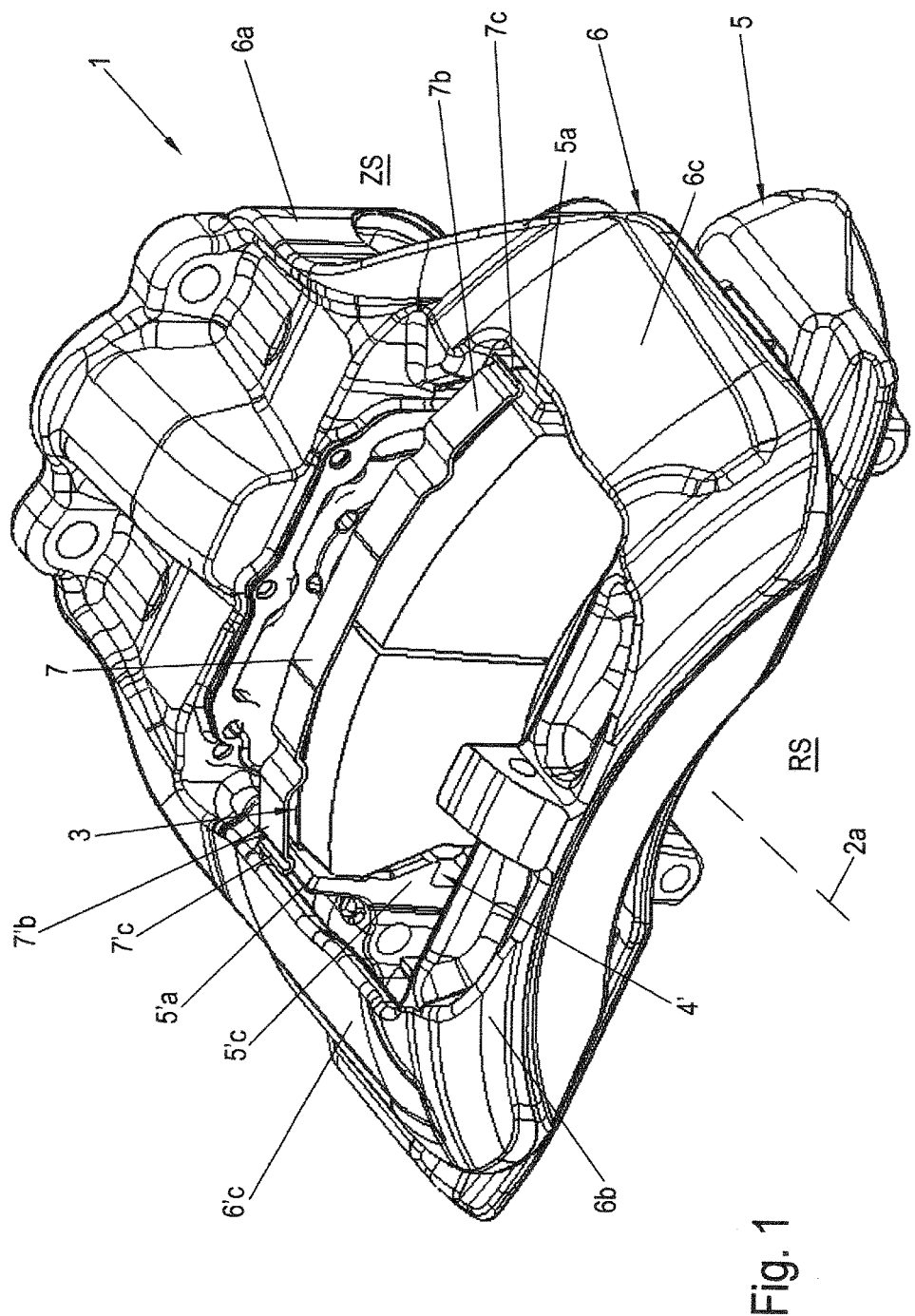
FIG. 1 shows a perspective view of a first embodiment of a disc brake according to the invention.
Figure 2:
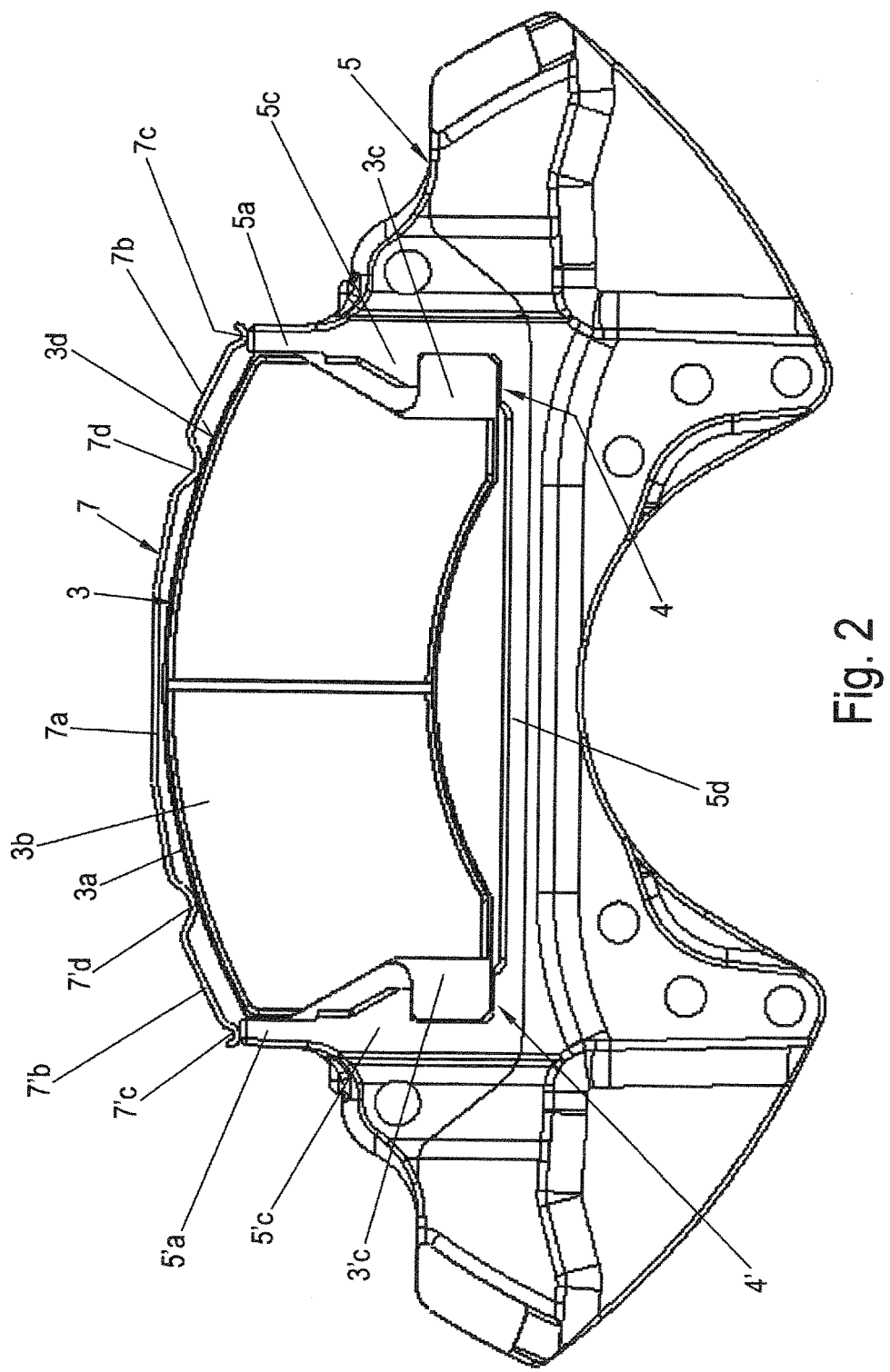
FIGS. 2-4 show partial views of a brake carrier of the disc brake according to the invention according to FIG. 1 with a brake pad according and embodiment of the invention.
Figure 3:
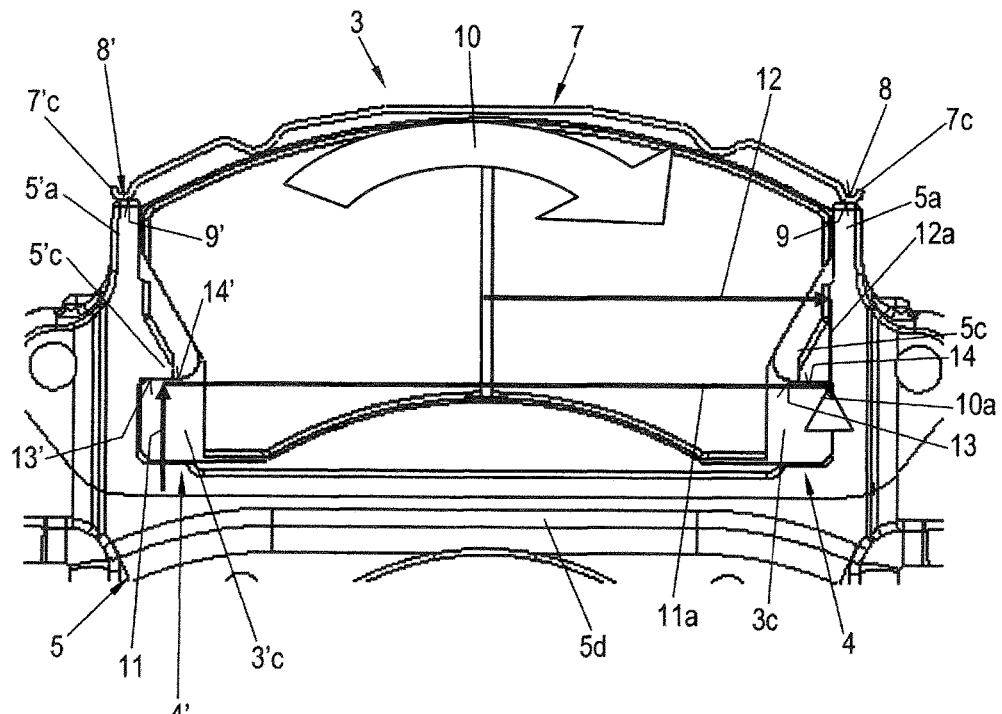
Figure 4:
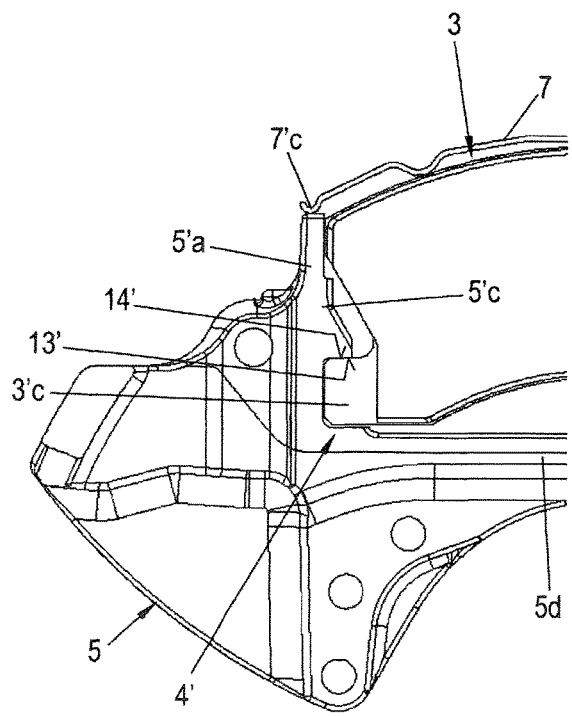
Figure 9:
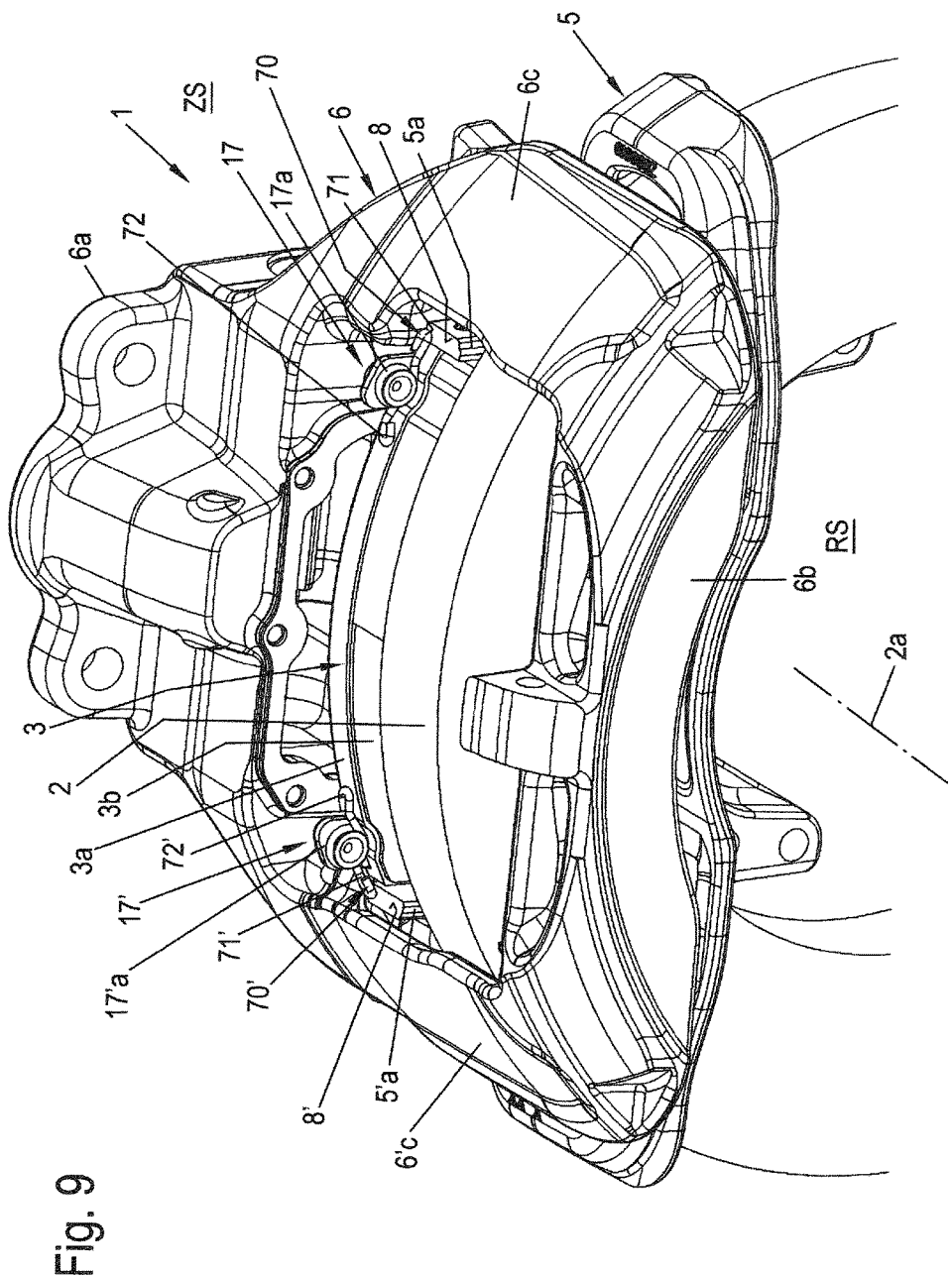

FIG. 1 shows a perspective view of a first embodiment of a disc brake 1 according to the invention, for example a pneumatic disc brake 1. FIGS. 2 to 4 illustrate partial views of a brake carrier 5 of the disc brake 1 according to the invention according to FIG. 1 with a brake pad 3 according to the invention. For the sake of better clarity, a brake disc 2 is not shown in FIG. 1, but is easily imaginable, for example as shown in FIG. 9. FIG. 2 shows a top view of a friction pad 3b of the brake pad 3 in a brake carrier 5. FIG. 3 illustrates forces 11, 12 acting on the brake pad 3. FIG. 4 shows an enlarged illustration of one side of the brake pad 3 in engagement with a brake carrier horn 5'a.

The disc brake 1 is, for example, part of the brake system of a vehicle, in particular of a commercial vehicle, and comprises the brake disc 2 having a brake disc rotational axis 2a, and two brake pads 3 which are arranged on both sides of the brake disc 2. Of the two brake pads 3, only an "application-side" brake pad 3 is shown here. The other "back-side" brake pad is easily imaginable, and may be identical to, or shaped differently from, the application-side brake pad. Furthermore, the disc brake 1 comprises the brake carrier 5, a brake caliper 6 and an application device (not shown).

The brake pad has a pad back plate 3a, on which the friction pad 3b is attached. The brake pads 3 are each accommodated in the brake carrier 5 in a pad slot 15, 16 (also see FIGS. 5, 6) between in each case two brake carrier horns 5a, 5'a; 5b, 5'b and are held in the brake carrier 5. A pad-retaining clip (not shown) is positioned above, i.e., radially outboard of, the brake pads 3. At least the brake pad 3 is guided displaceably in the direction of the brake disc rotational axis 2*a* in the associated pad slot 15. During forward travel of the associated vehicle in a positive x direction, the brake disc 2 rotates about the brake disc rotational axis 2*a* thereof in a main direction of rotation 10 (FIG. 3). That side of the brake caliper 6 which is located on the left of FIG. 1 is therefore referred to as the entry side and that side of the brake caliper 6 which is located on the right is referred to as the exit side. Accordingly, the brake carrier horns 5'*a*, 5'*b* are referred to as entry-side brake carrier horns 5'*a*, 5'*b* and the opposite brake carrier horns 5*a*, 5*b* are referred to as exit-side brake carrier horns 5*a*, 5*b*. Unless stated otherwise, components and assemblies which are assigned to the entry side are identified below by an apostrophe at the respective reference sign.

The brake caliper 6 is designed here as a sliding caliper and has an application section 6*a* and a back section 6*b* which are connected to each other at both ends in the direction of the brake disc rotational axis 2*a* via connecting sections 6*c*, 6'*c*. The application section 6*a* and the back section 6*b* are respectively arranged here on one side of the brake disc 2 in a manner parallel thereto, wherein the connecting sections 6*c* extend in the y direction parallel to the brake disc rotational axis 2*a*. The application section 6*a* and the back section 6*b* together with the connecting section 6*c* form an opening over the brake disc 2 with the brake pads 3 for access thereto during installation, exchange and maintenance work.

The application section 6*a* of the brake caliper 6 receives the application device of the disc brake 1. The application device serves for actuating the disc brake 1 and can have, for example, a pivoted brake lever with a compressed air cylinder. This is not described further here.

That side of the disc brake 1 on which the application section 6*a* of the brake caliper 6 is arranged together with the application device is referred to below as the application side ZS. The other side of the disc brake 1, on which the back section 6*b* of the brake caliper 6 is arranged, is referred to below as the back side RS, which is also called the reaction side. These terms "application side" and "back side" and other designations referring thereto are conventional and are used for better orientation.

The brake pad 3 with the pad back plate 3*a*, which is located on the application side ZS, is thus referred to as the application-side brake pad 3, and the opposite brake pad to the latter is referred to in a corresponding manner as back-side brake pad.

The application-side brake pad 3 is acted upon by the application device during braking operations with an application force in the direction of the brake disc rotational axis 2*a*. The back-side brake pad, which is not shown but is imaginable, is accommodated in the back section 6*b* of the brake caliper 6 and, in the case of this disc brake 1 with the sliding brake caliper 6 does not have any movements relative to the back section 6*b*.

The application-side brake pad 3 is provided with a pad-retaining spring 7 on an upper side 3*d* of the pad back plate 3*a*. The pad-retaining spring 7 (FIG. 2) comprises a central section 7*a*; arms 7*b*, 7'*b*; pressure sections 7*c*, 7'*c* and transition sections 7*d*, 7'*d*.

The central section 7*a* is fastened to the upper side 3*d* of the pad back plate 3*a* approximately in the center of the upper side 3*d* and extends to both sides in the longitudinal direction of the pad back plate 3*b* (i.e. parallel to the brake disc 2 in the fitted state of the brake pad 3) in each case to a length which approximately corresponds to a quarter of a length of the pad back plate 3*d* in the longitudinal direction.

The fastening of the central section 7*a* can take place, for example, by welding, rivets, screws and the like.

A respective transition section 7*d*, 7'*d* via which a respective arm 7*b*, 7'*b* is connected to the central section 7*a* is attached to each end of the central section 7*a*. The transition sections 7*d*, 7'*d* are of curved design, wherein said transition sections are shaped convexly towards the upper side 3*d* of the pad back plate 3*a*. In this manner, the transition sections 7*d*, 7'*d* each rest in linear contact on the upper side 3*d* of the pad back plate 3*a*. In this example, in the fitted state of the brake pad 3, the linear contact runs parallel to the brake disc rotational axis 2*a*. Of course, other contact forms are also possible, for example single-point contact, multi-point contact, multiline contact, etc.

The convex transition section 7*d*, 7'*d* span the central section 7*a*, as a result of which said transition sections are pressed onto the upper side 3*d* by means of the spring force of the central section 7*a*.

Each transition sections 7*d*, 7'*d* merges into a respective arm 7*b*, 7'*b*. Each arm 7*b*, 7'*b* extends as far as a respective end of the upper side 3*d* of the pad back plate 3*a* and rests with its respective end on the latter when the brake pad 3 is not fitted.

A respective pressure section 7*c*, 7'*c* which protrudes in each case over the associated end of the upper side 3*d* in the longitudinal direction of the pad back plate 3*a* and is pressed onto the upper side 3*d* of the pad back plate 3*a* by the spring force of the central section 7*a*, of the transition sections 7*d*, 7'*d* and of the arms 7*b*, 7'*b* is attached to each free end of an arm 7*b*, 7'*b*.

Each pressure section 7*c*, 7'*c* is of convex design in such a manner that the convex side thereof faces downwards towards the pad back plate 3*a*. A rounding of the pressure sections 7*c*, 7'*c* is smaller than a rounding of the transition sections 7*d*, 7'*d*.

In this example, a width of the pad-retaining spring 7 is constant and corresponds here approximately to a thickness of the pad back plate 3*a*. Width and thickness run in the direction of the brake disc rotational axis 2*a*. Of course, the width of the pad-retaining spring 7 can also run differently with respect to the pad back plate 3*a* or/and non-constantly.

The application-side pad slot 15 is delimited on both sides by the brake carrier horns 5*a*, 5'*a* and in this embodiment is closed on the lower side thereof by a strut 5*d* (the strut 5*d* may be omitted). Each brake carrier horn 5*a*, 5'*a* has, approximately in the center thereof in a direction perpendicular to the brake disc rotational axis 2*a*, a respective lug 5*c*, 5'*c* which protrudes inwards into the pad slot 15 and has rounded corners. An undercut 4, 4' is formed below each lug 5*c*, 5'*c*, said undercut being formed into the respective brake carrier horn 5*a*, 5'*a* in each case outwards, i.e. starting from the pad slot 15 in a plane parallel to the brake disc 2, and in each case forming a contour with the lug 5*c*, 5'*c*. Each undercut 4, 4' runs below each lug 5*c*, 5'*c* into the respective brake carrier horn 5*a*, 5'*a* initially parallel to the strut 5*d*. Said respective contour then runs in each case at a right angle in the brake carrier horn 5*a*, 5'*a* downwards as far as a rest which, for its part, extends at a right angle towards the inner side of the pad slot 15 over a distance which approximately corresponds to the length of the undercut 4, 4' below each lug 5*c*, 5'*c*. Said rests are connected by the strut 5*d*, wherein an upper side of the struts 5*d* is arranged lower, i.e. further towards the brake disc rotational axis 2*a*, than the surfaces of the rests. In alternative embodiments, the rests may be omitted if equivalent rest surfaces between the brake pad back plate 3*a* and the lugs 5*c*, 5*c*' are located at a higher location, for example, at flat surfaces machined into the top of the lugs 5c, 5c' and into the back plate in the region directly above the machined flats.

Each side of the application-side pad back plate 3a interacts with a respective brake carrier horn 5a, 5'a and has a contour which corresponds to the respective contour of the associated brake carrier horn 5a, 5'a. In other words, the shape of each lug 5c, 5'c is formed into the associated side of the pad back plate 3a, wherein a respective rectangular projection 3c, 3'c of the pad back plate 3a is formed, said projection corresponding with the respective associated undercut 4, 4' of a brake carrier horn 5a, 5'a. In this manner, the application-side brake pad 3 is accommodated by the pad back plate 3a in the application-side pad slot 15 in the contours with the lug 5c, 5'c and with the undercut 4, 4' in a form-fitting manner such that the application-side brake pad 3 is guided displaceably in the direction of the brake disc rotational axis 2a, but is fixed in the perpendicular direction to the brake disc rotational axis 2a. Only the end regions of the lower side of the application-side pad back plate 3a rest here on the respective rests at the ends of the strut 5d.

Figure 5:
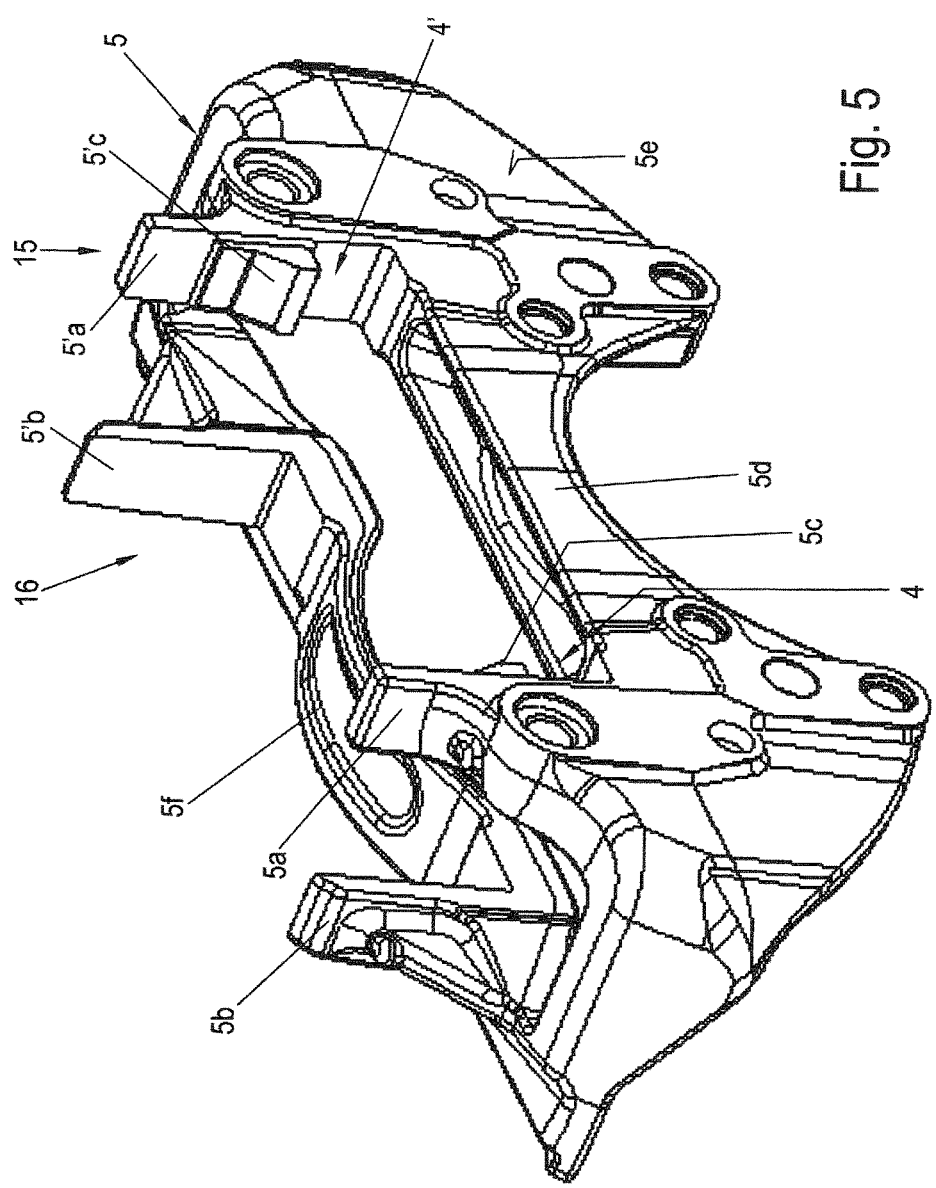
FIGS. 5-7 show views of the brake carrier according to FIGS. 2-4.
Figure 6:
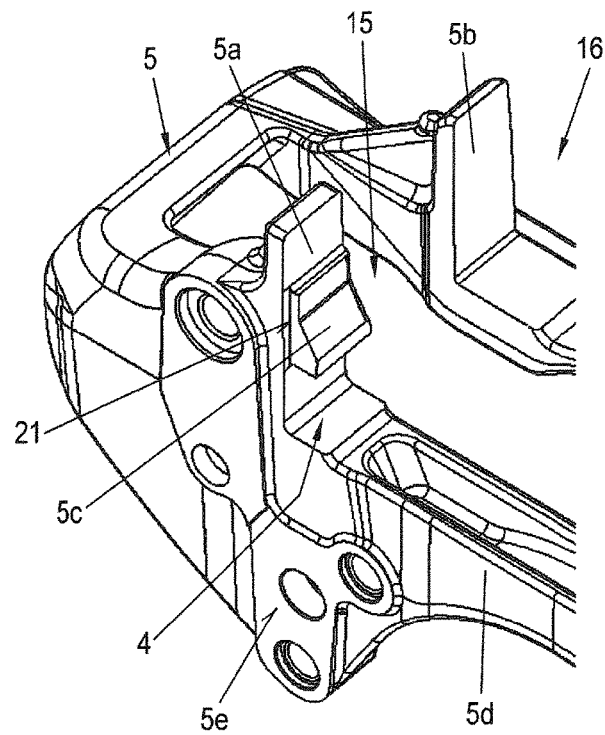

In FIG. 2, the brake pad 3 is inserted into the pad slot 15 of the brake carrier 5. This takes place first of all by inserting the brake pad 3 radially into the intermediate space between the pad slots 15, 16 (FIGS. 5, 6).

In this embodiment, during installation the pad-retaining spring 7 is first of all supported on a brake carrier horn 5a, 5'a. The brake pad 3 is thereby aligned to slide into the undercuts 4, 4' of the brake carrier 5. Subsequently, the brake pad 3 is fixed in the pad slot 15 of the brake carrier 5 and can be pushed in the axial direction, i.e., in the direction of the brake disc rotational axis 2a, into the working position thereof by the brake caliper 6.

The contours of the sides of the pad back plate 3a of the brake pad 3 come into engagement here with the contours of the lugs 5c, 5'c and of the undercuts 4, 4' and form a form-fitting contact. The convex sides of the pressure sections 7c, 7'c of the pad-retaining spring 7 are then in each case in contact by the contact sections 9, 9' thereof for resting on rest sections 8, 8' (FIG. 3) on the upper sides of the brake carrier horns 5a, 5'. The pad-retaining spring 7 is supported here on the application-side brake carrier horns 5a, 5'a and is tensioned upwards counter to the spring force of the pad-retaining spring 7.

The pad-retaining spring 7 which is tensioned on both sides in this manner exerts a tensile force on the brake pad 3 outwards in the radial direction in a manner pointing away from the brake disc rotational axis 2a. This results in a play-free contact of the brake pad 3 against the brake carrier horns 5c, 5'c by undercut surfaces 14, 14' of the brake pad projections 3c, 3'c on undercut surfaces 13, 13' of the lower sides of the carrier horn lugs 5c, 5'c.

In order to reduce tangential oblique wear (over the longitudinal side, i.e. the long side of the brake pad 3), in particular in the case of single-brake application spindle embodiments of the disc brake 1, a frictional force 11 is produced on the entry-side undercut surface 13', 14' by lever kinematics. The latter use a lever arm 11a to generate a torque about a pivot point 10a. The pivot point 10a lies in contact here between an upper corner edge of the exit-side projection 3c and a lower corner edge of the lug 5c of the exit-side brake carrier horn 5a between the undercut surfaces 13 and 14.

Said torque acts counter to an entering torque (force 12 with a lever arm 12a—a known effect which allows the entering side of the friction pad 3b to be worn more severely by support of the pad back plate 3a of the brake pad 3 on the exit-side brake carrier horn 5a) and therefore compensates for a part of the (tangential) oblique pad wear.

For optimum use of this effect, the undercut surfaces 13, 14; 13', 14' are designed in such a manner that they are in engagement in a play-free manner in the fitted state of the brake pad 3.

Figure 7:
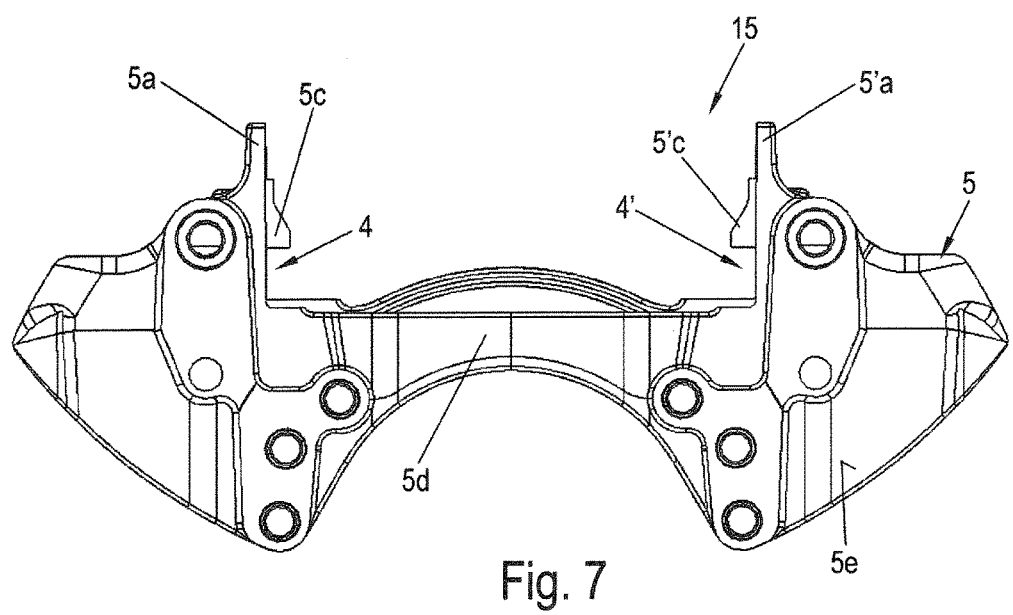

FIGS. 5 to 7 illustrate views of the brake carrier 5 according to FIGS. 2 to 4 of the disc brake 1 according to the invention according to FIG. 1.

FIG. 5 shows a perspective illustration of the brake carrier 5, as seen from the application side ZS (FIG. 1) looking at a fastening side 5e of the brake carrier 5. The application-side pad slot 15 with the brake carrier horns 5a, 5'a and the lugs 5c, 5'c protruding into the pad slot 15 can clearly be seen. The back-side pad slot 16 has brake carrier horns 5b, 5'b without lugs, which are connected by a strut 5f parallel to the strut 5d.

FIG. 6 illustrates the exit-side undercut 4 in enlarged form in a perspective view.

FIG. 7 shows an elevation view of the fastening side 5e of the brake carrier 5. The brake carrier 5 is attached by the fastening side 5e thereof to positionally fixed fastening sections of the vehicle.

Figure 8:
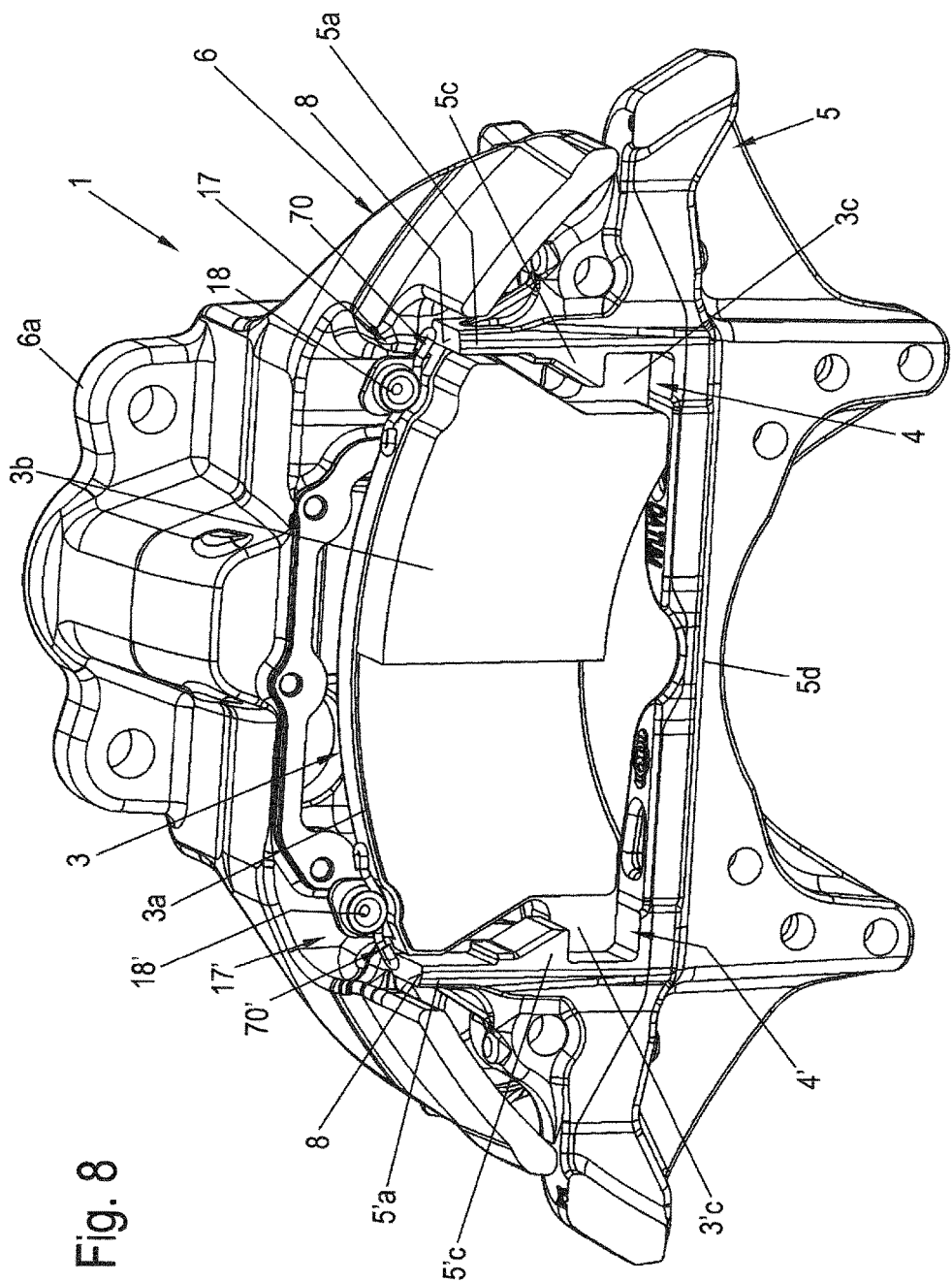
FIGS. 8-9 show views of a second embodiment of the disc brake according to the invention.
Figure 10:
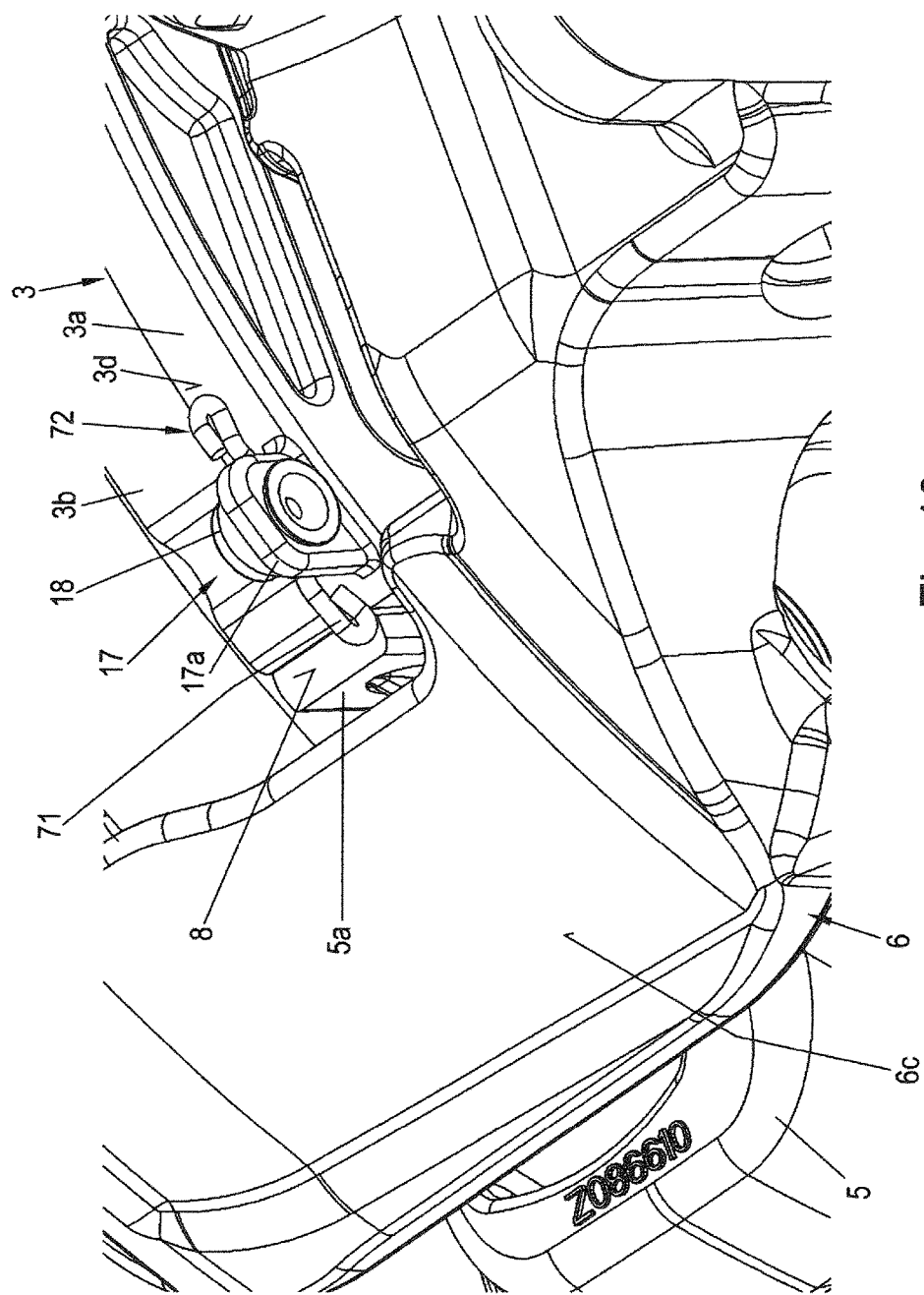
FIGS. 10-11 show enlarged partial views of the second embodiment of the disc brake according to FIGS. 8-9.
Figure 11:
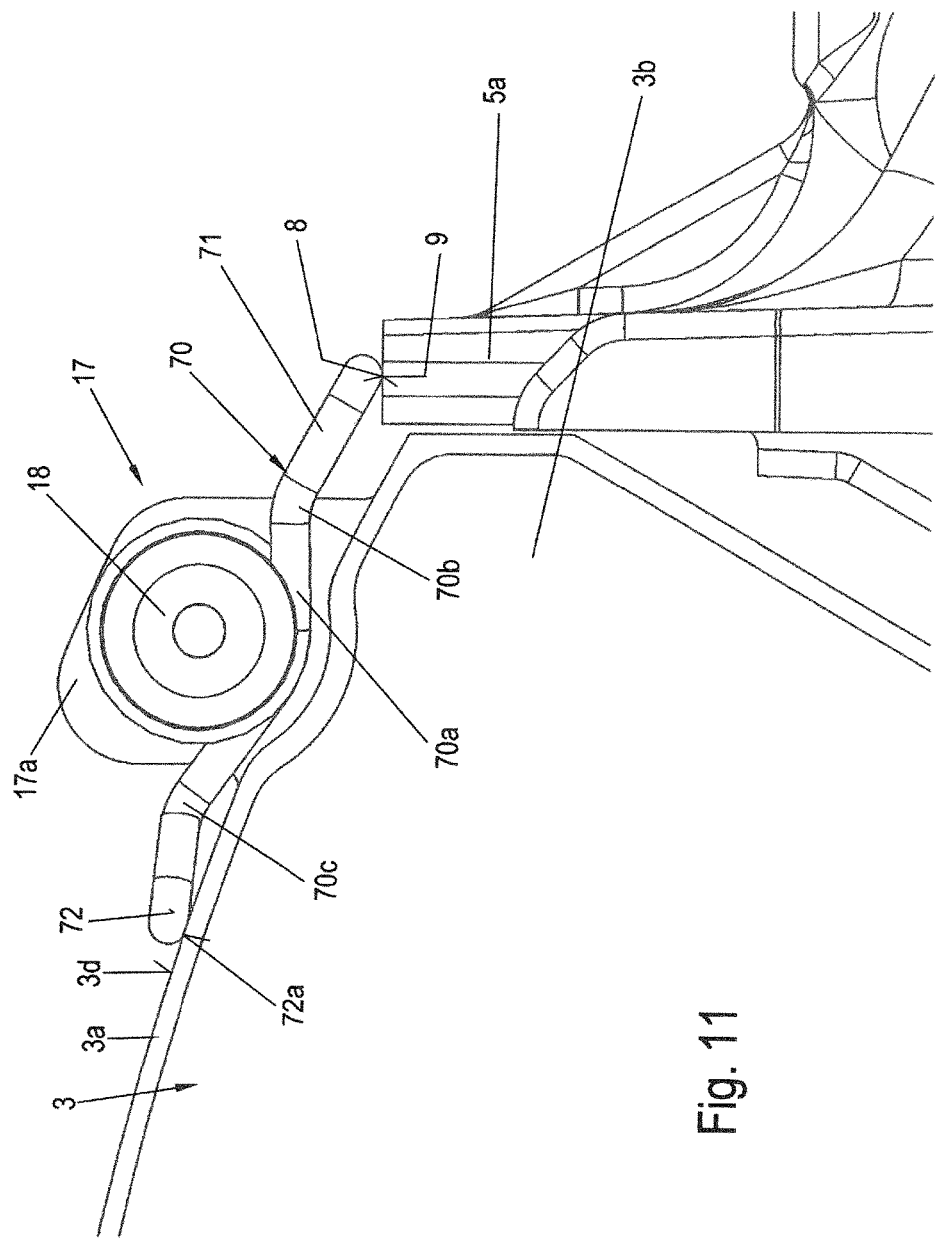

FIGS. 8 and 9 show views of a second embodiment of the disc brake 1 according to the invention. A partial sectional view is illustrated in FIG. 8, wherein the section runs in a plane through the brake carrier 5 parallel to a brake disc plane. FIG. 9 shows a perspective view of the second embodiment of the disc brake 1. FIGS. 10 and 11 show enlarged partial views of the second embodiment of the disc brake 1 according to FIGS. 8 and 9.

In this second embodiment, the components of the disc brake 1 are identical to those in the first embodiment except for the brake pad 3. Therefore, only the differences of the brake pad 3 will be dealt with below.

The application-side brake pad 3 also has a pad back plate 3a with a friction pad 3b in this embodiment. The pad back plate 3a is provided with contours which correspond with contours of the lugs 5c, 5'c and undercuts 4, 4'. This has already been described above in conjunction with the first embodiment.

The pad back plate 3a is formed in the side regions thereof on the upper side 3d with a respective spring holder 17, 17' for at least one pad-retaining spring 70, 70' in each case. Each spring holder 17, 17' comprises a projection 17a, 17'a which protrudes upwards from the pad back plate 3a. Each projection 17a, 17'a is plate-like and protrudes upwards in approximately double the thickness of the pad back plate 3a. An expansion of each projection 17a, 17'a in the longitudinal direction of the pad back plate 3a likewise corresponds approximately to double the thickness of the pad back plate 3a. Each projection 17a, 17'a is arranged offset at a distance from each side of the pad back plate 3a toward the center thereof in the longitudinal direction thereof, wherein said distance approximately corresponds to the thickness of the pad back plate 3a.

The back surface, which faces towards the application side ZS, of each projection 17a, 17'a is aligned with the back surface of the pad back plate 3a which faces towards the application side ZS.

A respective retaining element 18, 18' is attached in the center of the side facing towards the friction pad 3b of each projection 17a, 17'a. In this embodiment, said retaining element 18, 18' is a roller which is fixedly attached or is rotatable about an axis running parallel to the brake disc axis 2a. Said roller can be designed, for example, as a cable roller. The upper side 3d of the pad back plate 3a is provided in the region below each retaining element 18, 18' with a respective curved recess which corresponds with a roller diameter of the retaining element 18, 18' and with respect to which each retaining element 18, 18' is arranged at a distance.

A respective pad-retaining spring 70, 70' is arranged between each retaining element 18, 18' and the upper side 3*d* of the pad back plate 3*a* and is pretensioned by the shape thereof and the arrangement between each retaining element 18, 18' and the respective recess of the upper side 3*d*. Said pretensioning has the effect that each pad-retaining spring 70, 70' rests with one end on the upper side 3*d* of the pad back plate 3*a* under pretension, wherein the other end protrudes over the respective end of the upper side 3*d* in the longitudinal direction of the pad back plate 3*a* and rests in a pretensioned manner on said end of the upper side 3*d* when the brake pad 3 is not fitted.

Each pad-retaining spring 70, 70' comprises a central section 70*a*, transition sections 70*b* and 70*c*, at least one pressure section 71, 71' and at least one bearing section 72, 72'.

The exit-side pad-retaining spring 70 is described below. The construction of the entry-side pad-retaining spring 70' is of mirror-inverted design.

A transition section 70*b*, 70*c* is attached to each end of the central section 70*a*. The transition section 70*b* faces towards one end of the upper side 3*d* of the pad back plate 3*a* and connects the central section 70*a* to the pressure section 71. The transition section 70*c* is attached on the other side of the central section 70*a*, faces towards the center of the upper side 3*d* and connects the central section 70*a* to the bearing section 72. Each transition section 70*b*, 70*c* is shaped with regard to the upper side 3*d* in a manner curved towards the latter.

The lower side of the free end of the pressure section 71 has a contact section 9 which, in the fitted state of the brake pad 3, rests on the rest section 8 of the brake carrier horn 5*a*. If the brake pad 3 is not fitted, the pressure section 71 rests on the end of the upper side 3*d* of the pad back plate 3*a*.

The lower side of the free end of the bearing section 72 has a rest section 72*a* which rests continuously on the upper side 3*d* of the pad back plate 3*a*.

The central section 70*a* is arranged between the retaining element 18 and a recess of the upper side 3*d* of the pad back plate 3*a*, wherein the central section 70*a* does not make contact with the upper side 3*d*. This is made possible by the recess and also by the configuration of the retaining element 18 in the form of a cable roller.

The transition sections 70*b*, 70*c* span the central section 70*a*, as a result of which the pressure section 71 is pressed by the spring force of the central section 7*a* either onto the end of the upper side 3*d* or onto the brake carrier horn 5*a*. At the same time, the central section 70*a* which is tensioned in this manner has the effect that the bearing section 72 is also pressed onto the upper side 3*d*.

In this example, the pad-retaining springs 70, 70' are produced from a spring wire material. In this case, the ends are correspondingly bent over in order to form the pressure section 71, 71' and the bearing section 72, 72'. Punctiform or/and curved contact sections are produced here in interaction with the respective rest surfaces.

The brake pad 3 is installed as described in the first embodiment.

Figure 12:
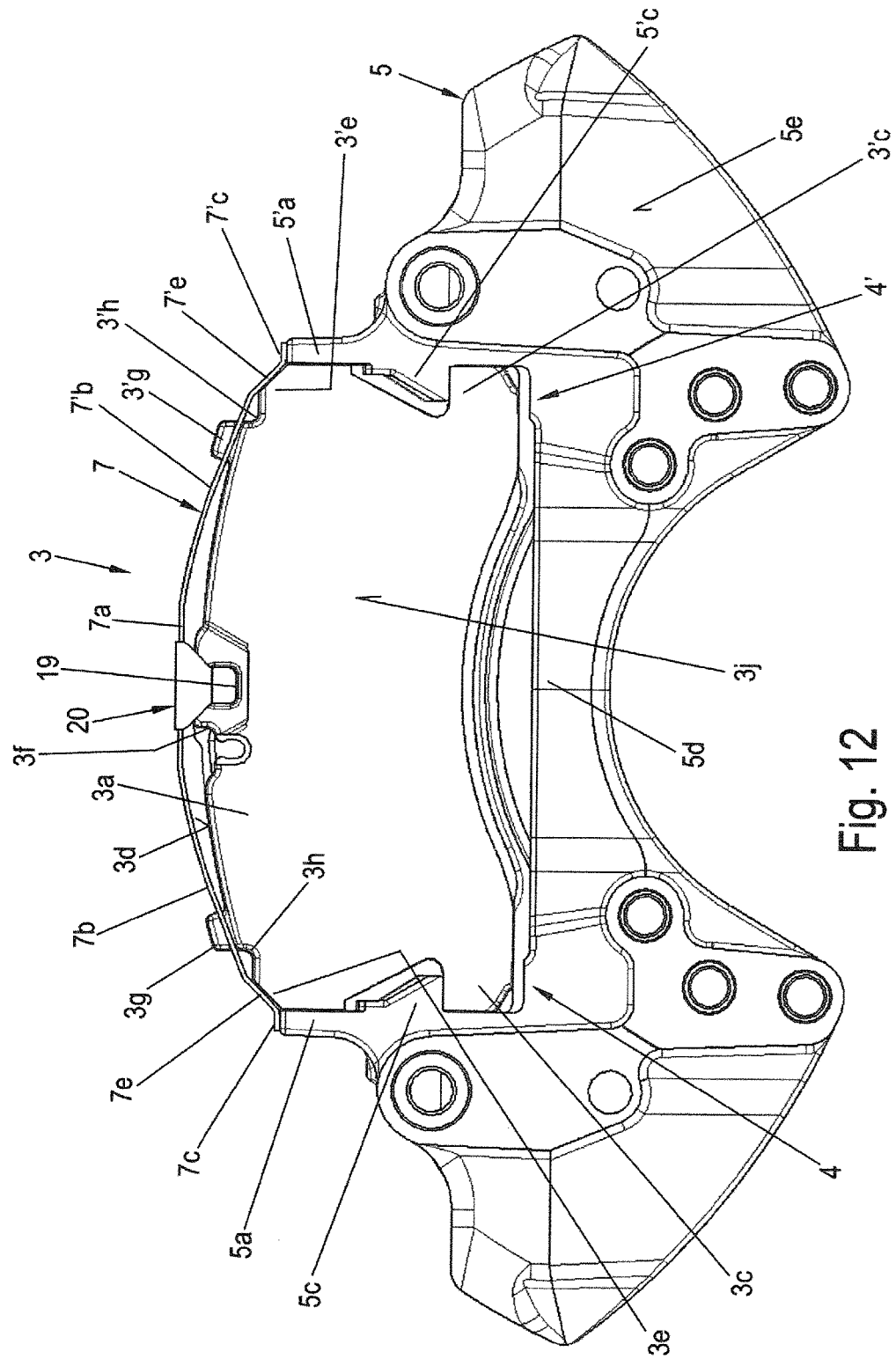
FIGS. 12-13 show partial views of a third embodiment of the disc brake according to the invention.
Figure 13:
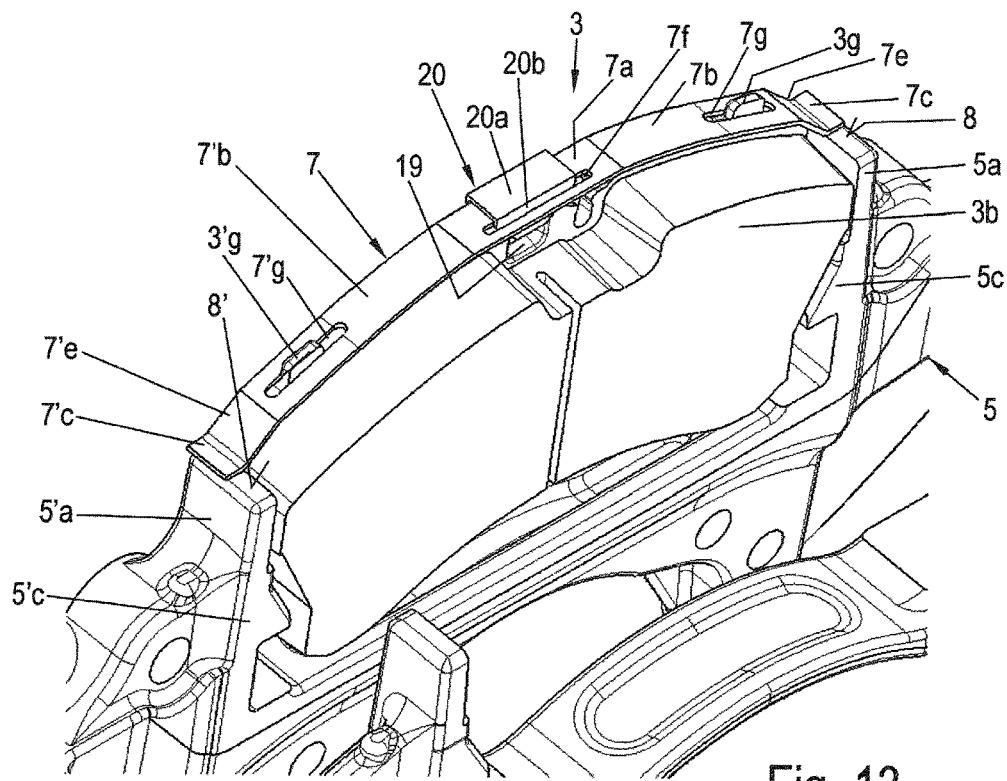
Figure 14:
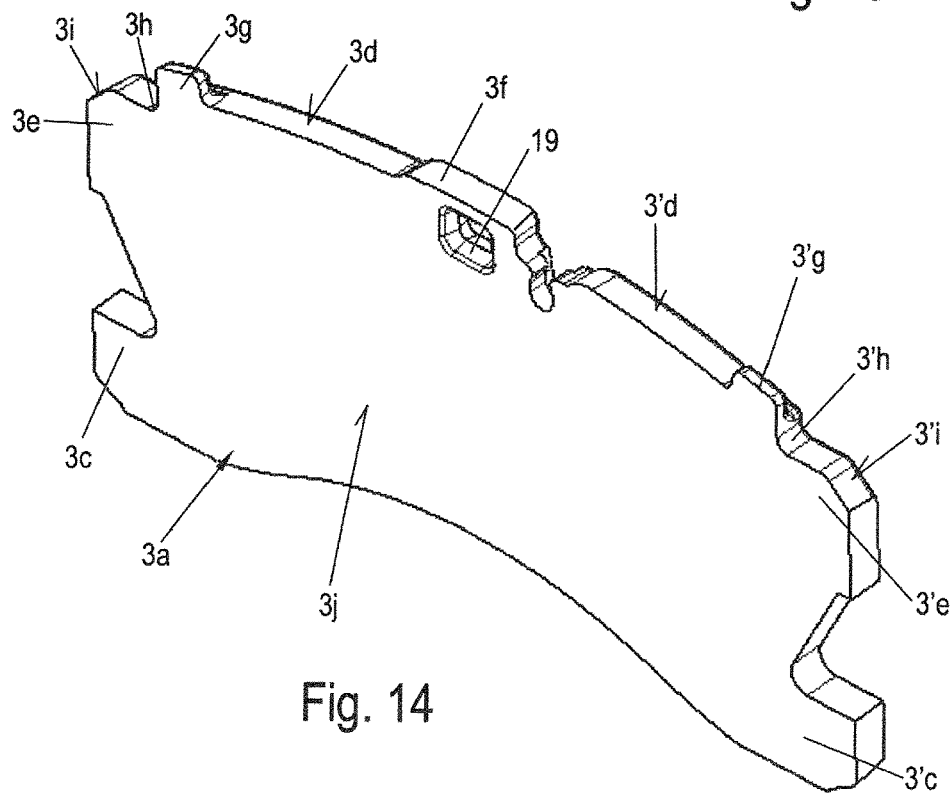
FIG. 14 shows a perspective view of a pad back plate of a brake pad of the third embodiment according to FIGS. 12-13.

FIGS. 12-13 show partial views of a third embodiment of the disc brake 1 according to the invention, wherein FIG. 12 shows a view of an actuation side 3*j* of the pad back plate 3, as seen from the application side ZS (FIG. 1). FIG. 13 shows a view from the brake disc 2. FIG. 14 is a perspective view of a pad back plate 3*a* of a brake pad 3 of the third embodiment according to FIGS. 12-13 onto the actuating side 3*j*. FIG. 15 is a perspective view of a pad-retaining spring 7 of the embodiment according to FIGS. 12-13. FIG. 16 illustrates a perspective view of a fastening element 20 of the pad-retaining spring 7 according to FIG. 15 of the brake pad 3 of the exemplary embodiment according to FIGS. 12-13.

In this third embodiment, the components of the disc brake 1 are identical to those in the first embodiment except for the brake pad 3. Therefore, only the differences of the brake pad 3 are dealt with below.

The application-side brake pad 3 also has a pad back plate 3*a* with a friction pad 3*b* in this embodiment. The pad back plate 3*a* is provided with the contours which are already described above and correspond with contours of the lugs 5*c*, 5'*c* and undercuts 4, 4'.

In contrast to the first embodiment, the pad-retaining spring 7 is fastened in the center thereof to a fastening section 3*f* by a fastening element 20. The fastening element 20 is described in more detail below.

In this third embodiment, the pad-retaining spring 7 includes a central section 7*a*; arms 7*b*, 7'*b*; pressure sections 7*c*, 7'*c* and intermediate sections 7*e*, 7'*e*.

The central section 7*a* is provided with a slit 7*f* running in the longitudinal direction of the pad-retaining spring 7 for receiving a section of the fastening element 20. The slit 7*f* does not run in an imaginary central line of the pad-retaining spring 7, but rather runs offset in the direction towards the friction pad 3*b* and parallel to the imaginary central line of the pad-retaining spring 7. Said imaginary central line runs in the longitudinal direction of the pad-retaining spring 7.

In contrast to the first embodiment, a length of the central section 7*a* corresponds approximately to half the length of the central section 7*a* of the pad-retaining spring 7 of the first embodiment.

A respective arm 7*b*, 7'*b* is attached to each end of the central section 7*a*. In contrast to the first embodiment, the arms 7*b*, 7'*b* are substantially longer, for example in each case twice the length of the central section 7*a*.

Each arm 7*b*, 7'*b* is provided in the region of the free end thereof with a respective slit 7*g*, 7'*g*. The slits 7*g*, 7'*g* serve in each case for receiving a guide projection 3*g*, 3'*g* on upper side 3*d* of the pad back plate 3*a*.

A respective pressure section 7*c*, 7'*c* is attached to each free end of an arm 7*b*, 7'*b* via an intermediate section 7*e*, 7'*e*. Each intermediate section 7*e*, 7'*e* is bent downwards in a manner facing towards the upper side 3*d* of the back plate 3*a* at an obtuse angle here from the respective arm end. To this end, each pressure section 7*c*, 7'*c* is bent upwards in the opposite direction on a respective free end of an intermediate section 7*e*, 7'*e*. The pressure sections 7*c*, 7'*c* each extend laterally beyond the pad back plate 3*a* and protrude from the latter at a distance which approximately corresponds to an expansion of a respective brake carrier horn 5*a*, 5'*a* in the longitudinal direction of the pad back plate 3*a*.

The fastening section 3*f* protrudes from the upper side 3*d* of the pad back plate 3*a* and has a continuous opening 19 which runs through the pad back plate 3*a* in the direction of the brake disc rotational axis 2*a*. On that side of the pad back plate 3*a* on which the friction pad 3*b* is attached, the friction pad 3*b* in the region of the opening 19 is recessed below and next to the latter, as can be seen in FIG. 13.

The fastening element 20 (see FIG. 16) is designed here in the manner of a clamp and comprises a plate 20*a*, to the longitudinal sides of which respective trapezoidal side walls 20b, 20c are attached in each case approximately at a right angle. The trapezoidal side walls 20b, 20c run parallel and are connected at the short lower sides thereof by a transverse section 20d. The transverse section 20d is attached at a right angle to one side wall 20b and is connected to the lower side of the other side wall 20c at a connection 20e, for example a weld seam. The transverse section 20d runs parallel to the plate 20a and, in the mounted state of the pad-retaining spring 7, extends through the opening 19. The connection 20e is produced after the installation.

In the mounted state, the one trapezoidal side wall 20b is guided through the slit 7f running in the longitudinal direction of the pad-retaining spring 7. A wider longitudinal section of the central section 7a of the pad-retaining spring 7 is arranged here between the side walls 20b, 20c and between the lower side of the plate 20a and the upper side 3d of the fastening section 3f of the pad back plate 3a with a certain play in the radial direction with respect to the brake disc rotational axis 2a.

In the mounted state of the pad-retaining spring 7 on the upper side 3d of the pad back plate 3a, the guide projections 3g, 3'g each extend through a slit 7g, 7'g of the pad-retaining spring 7 and protrude from the upper side of each arm 7b, 7'b. Contact sections 9, 9' on the lower sides of the pressure sections 7c, 7'c of the pad-retaining spring 7 are each in contact here with an associated rest section 8, 8', as already described above.

In addition, in this embodiment, the pad back plate 3a has upper bevelled corner sections 3e, 3'e having a respective bevel 3i, 3'i. Each bevel 3i, 3'i merges via a recess 3h, 3'h into a respective guide projection 3g, 3'g and into the upper side 3d of the pad back plate 3a. The recesses 3h, 3'h run from the respective bevel 3i, 3'i initially in a rectilinear section which then has a respective rounded portion in the transition to the respective guide projection 3g, 3'g and the upper side 3d.

Figure 17:
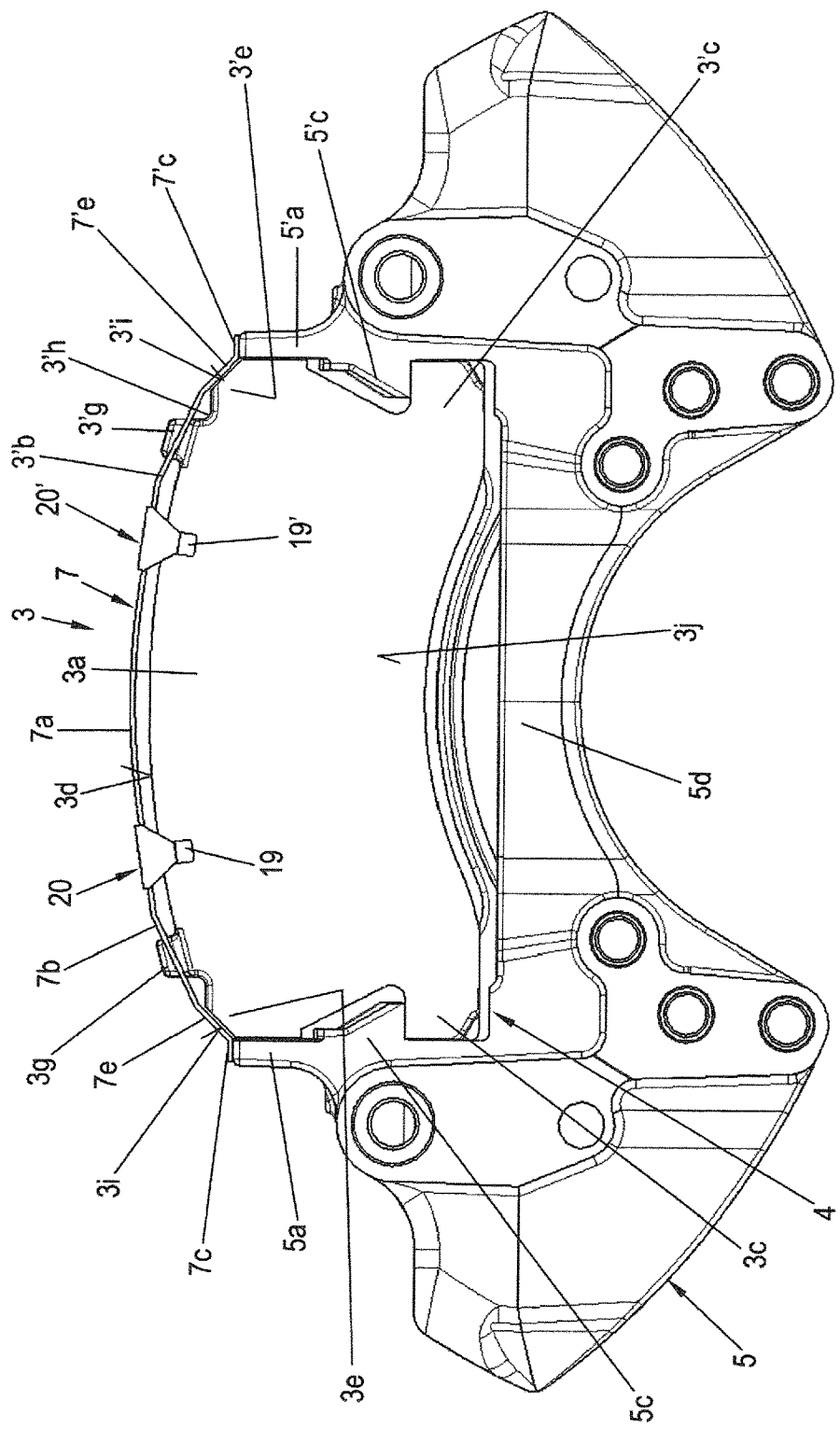
FIGS. 17-18 show partial views of a fourth embodiment of the disc brake according to the invention.
Figure 18:
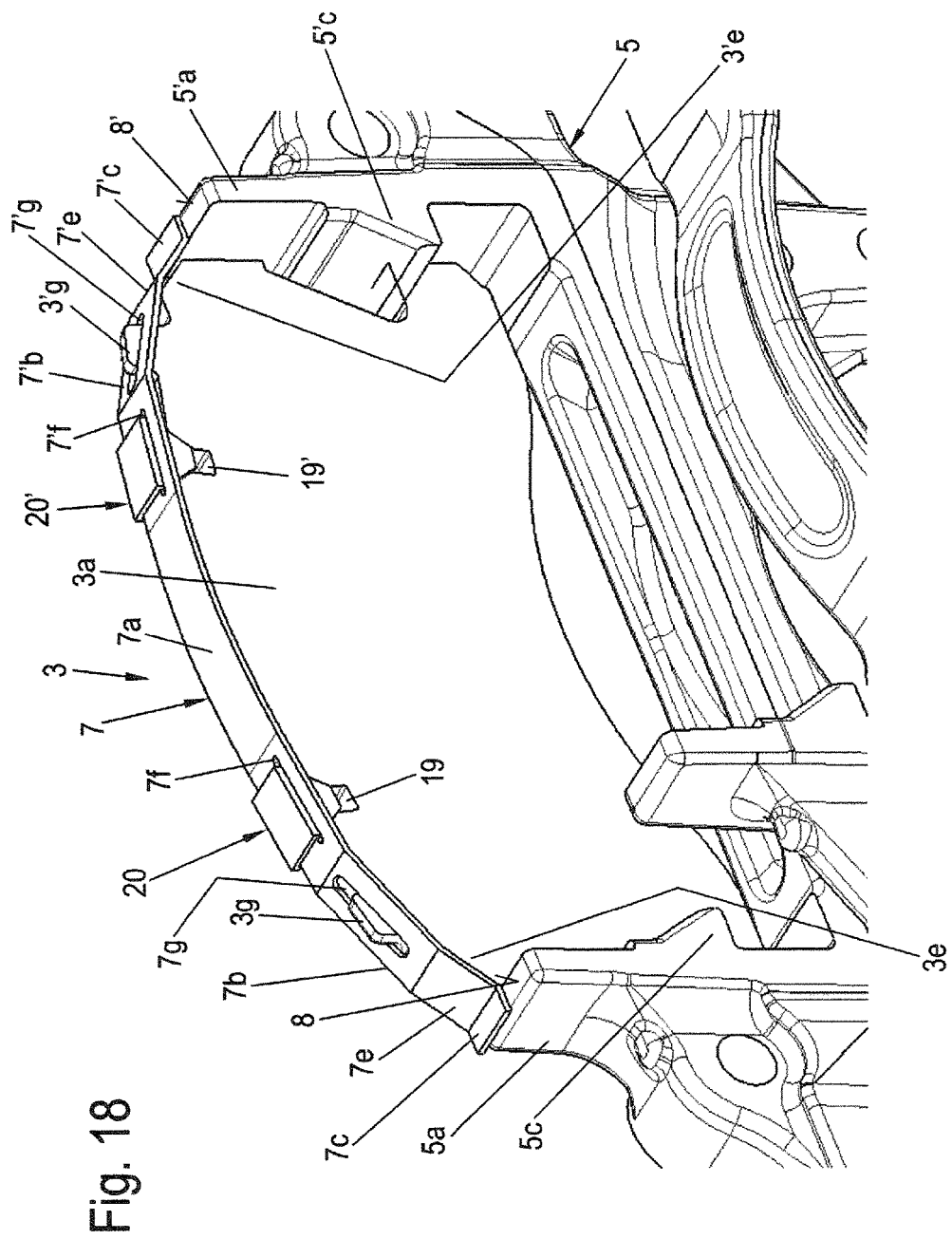

FIGS. 17-18 illustrate partial views of a fourth embodiment of the disc brake 1 according to the invention, wherein FIG. 17 shows a view of the actuation side 3j of the pad back plate 3, as seen from the application side ZS (FIG. 1). FIG. 18 shows a view of the pad back plate 3a without friction pad 3b from the brake disc 2. FIG. 19 shows a perspective view of the pad back plate 3a of the brake pad 3 of the fourth embodiment according to FIGS. 17-18, as seen from the side of the friction pad 3b. The friction pad 3b is not shown here, but is easily imaginable. FIG. 20 shows a perspective view of the pad-retaining spring 7 of the embodiment according to FIGS. 17-18.

In contrast to the third embodiment, the pad back plate 3a does not have a fastening section 3f with an opening 19, but rather an upper side 3d which is continuous between the guide projections 3g, 3'g. Two openings 19, 19' which are each arranged in the vicinity of a guide projection 3g, 3'g are provided in this fourth embodiment. A distance of said openings 19, 19' from each other is smaller here than a distance of the guide projections 3g, 3'g from each other.

In contrast to the third exemplary embodiment, the pad-retaining spring 7 of the fourth exemplary embodiment is in each case fastened in the end regions of the central section 7a to the pad back plate 3a by a fastening element 20, 20'. The fastening elements 20, 20' are of identical design. A description in this regard has already been given above.

In this fourth embodiment, the pad-retaining spring 7 includes the central section 7a; arms 7b, 7'b; pressure sections 7c, 7'c and intermediate sections 7e, 7'e.

The central section 7a is provided in the end regions thereof with a respective slit 7f, 7'f running in the longitudinal direction of the pad-retaining spring 7 for receiving a section of a respective fastening element 20, 20', as described above.

In contrast to the third embodiment, a length of the central section 7a corresponds approximately to triple the length of the central section 7a of the pad-retaining spring 7 of the third exemplary embodiment and is somewhat shorter than the distance between the guide projections 3g, 3'g.

The arms 7b, 7'b are respectively attached to each end of the central section 7a. The arms 7b, 7'b have a length which corresponds approximately to half the length of an arm 7b, 7'b in the third embodiment.

Each arm 7b, 7'b is provided in the region of the free end thereof with a respective slit 7g, 7'g. The slits 7g, 7'g each serve for receiving a guide projection 3g, 3'g.

The pressure sections 7c, 7'c are in each case attached to each free end of an arm 7b, 7'b via an intermediate section 7e, 7'e, as already described in conjunction with the third embodiment.

The pad-retaining spring 7 is attached to the pad back plate 3a by the fastening elements 20, 20' in such a manner that the central section 7a runs at a substantially constant distance from the upper side 3d of the pad back plate 3a.

A set of brake pads has the at least one application-side brake pad 3 and at least one back-side brake pad. Said brake pads can also differ in length.

The invention is not restricted by the above-described exemplary embodiments, but rather can be modified within the scope of the attached claims.

For example, it is conceivable for the brake carrier 5 to be able to be realized with what is referred to as a radial groove 21 for simple installation of the brake pad 3. The groove 21 extends in the direction of the respective brake carrier horn 5a, 5'a between one side of the associated lug 5c, 5'c and an edge of the respective brake carrier horn 5a, 5'a. This is illustrated in FIG. 6.

Figure 21:
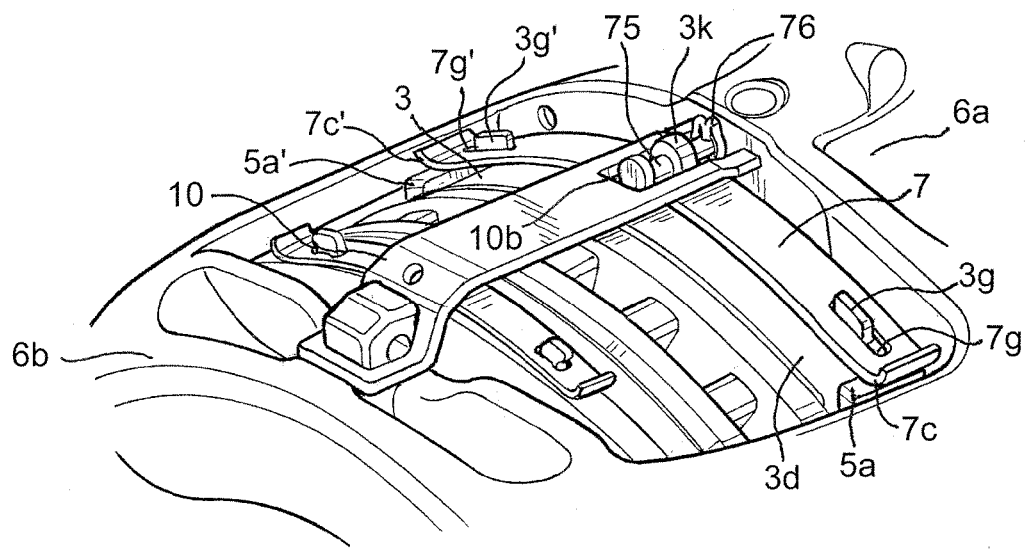
FIGS. 21-22 show a perspective view and a cross-section elevation view, respectively, of a pad back plate of a brake pad and a pad-retaining spring of a fifth embodiment of the disc brake according to the invention.
Figure 22:
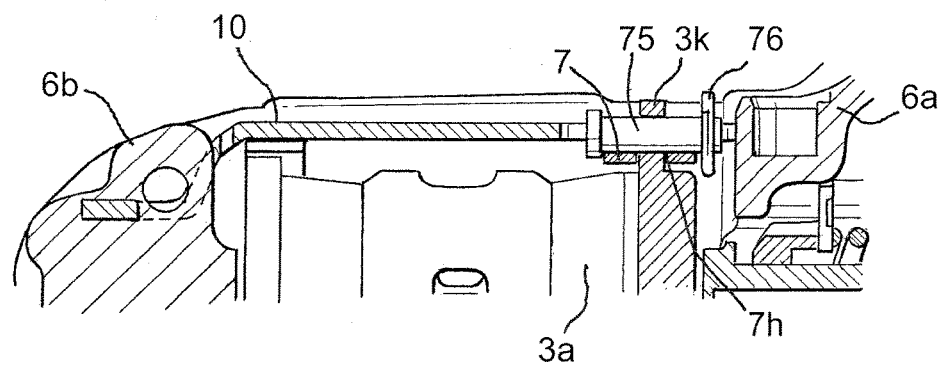

FIGS. 21-22 shown another embodiment which provides for maintaining a desired level of pad-retaining spring preload in highly spaced constrained environments. In the present invention, it is desirable to maintain a lifting force on the brake pads, in particular the inboard brake pad at all times following pad installation. For example, it may be desired to maintain a lifting force on the order of 200-250 N. In the event that this force must be maintained in a small available deflection range, for example 4 mm, a spring rate in the range of 50-65 N/mm would be required. However, a commercial disc brake of the type of the present invention may have an assembly tolerance on the order of 2 mm. Such a large tolerance could result in a pad-retaining spring having a 50-65 N/mm spring rate having a spring preload that could vary as much as 100-125 N, i.e., a variation that is greater than the 50 N tolerance of the desired 200-250 N preload range. Alternatively, if a pad-retaining spring with a lower spring rate were used, such as a 20 N/mm spring, the spring would have to deflect by between 10-12.5 mm to produce the desired 200-250 N lifting force. Such a deflection distance could not be tolerated in a space constrained environment.

FIG. 21 is a perspective view of an arrangement which can provide the desired brake pad lifting force in a space-constrained environment. In this embodiment, after the application-side brake pad 3 is initially installed in the brake carrier mount pad slot, the pad-retaining spring 7 is placed onto the upper surface 3d of the application-side brake pad back plate 3a, with pad-retaining spring slots 7g, 7g' engaging back plate projections 3g, 3g' and pad-retaining spring outer ends 7c, 7c' resting on carrier mount horns 5a, 5a'. The pad-retaining spring 7 is then pressed radially inward toward the upper surface 3d of the brake pad until a lift pin 75 can be inserted into an eye ring 3k of the brake pad back plate 3a that extends radially outward through an eye slit 7h of the pad-retaining spring 7 (visible in the FIG. 22 cross-section elevation view). Once the lift pin 75 is installed, it may be secured in place, for example by a cotter pin 76. Preferably the force required to compress the pad-retaining spring 7 a distance sufficient to insert the lift pin 75 is equal to the desired lift force preload, in this example a compressive force of 200-250 N.

The act of pressing radially inward to compress the pad retaining spring 7 may be facilitated by use of the pad-retaining clip 10 as an installation tool. For example, in an embodiment in which the pad-retaining clip 10 is present an end of the clip may be partially inserted into a recess in the caliper application-side 6a, then rotated downward onto the upper surface of the pad retaining spring 7. Due to the mechanical advantage provided by the length of the pad-retaining clip 10 as compared to the relatively short distance between the pad retaining spring 7 and the recess in the caliper application-side 6a, the spring 7 may be compressed with relative ease to a point at which the lift pin 75 can be inserted with little or no insertion force. Once the pin 75 is installed, the pad-retaining clip 10 may be released as the pin 75 takes up the preloading force being applied to the spring. If the pad-retaining clip 10 is then to be installed on the disk brake, it may be removed from the recess in the caliper application-side 6a and reoriented into the position in which it is installed when the brake is operable.

With this arrangement, the pad-retaining spring preload is established directly between the spring, the brake pad back plate and the mount horns, thereby substantially reducing or eliminating preload variations caused by assembly tolerance stack-up. This arrangement also permits use of pad-retaining springs with spring rates on the order of 20 N/mm, as the 10-12.5 mm of deflection required to establish a preload of 200-250 N may be accommodated during compression of the spring during brake pad installation, i.e., there is no need to be able to accommodate such large spring deflections during assembled brake operation. Further benefits of this spring preload arrangement include elimination of reliance on a retainer clip as a part of the brake pad lifting structure, although a retainer clip may still be present for other purposes, as shown in FIGS. 21 and 22. In these figures the retaining clip 10 is provided with a slot 10b to accommodate the eye ring 3k and lift pin 76.

Because such modifications of the disclosed embodiments incorporating the spirit and substance of the invention may occur to persons skilled in the art, the invention should be construed to include everything within the scope of the appended claims and equivalents thereof.

LIST OF REFERENCE SIGNS 1 disc brake
2 brake disc
2a brake disc rotational axis
3 brake pad
3a pad back plate
3b friction pad
3c, 3'c projection
3d upper side
3e, 3'e corner section
3f fastening section
3g, 3'g guide projection
3h, 3'h recess
3i, 3'i bevel
3j actuation side
3k eye ring
4, 4' undercut
5 brake carrier
5a, 5'a; 5b, 5'b brake carrier horn
5c, 5'c lug
5d strut
5e fastening side
5f strut
6 brake caliper
6a application section
6b reaction section
6c, 6'c connecting section
7 pad-retaining spring
7a central section
7b, 7'b arm
7c, 7'c pressure section
7d, 7'd transition section
7e, 7'e intermediate section
7f, 7'f; 7g, 7'g, h slit
8, 8' rest section
9, 9' contact section
10 main direction of rotation
10a pivot point
10b slot
11, 12 force
11a, 12a lever arm
13, 13' undercut surface
14, 14' undercut surface
15, 16 pad slot
17, 17' spring holder
17a projection
18, 18' retaining element
19, 19' opening
20, 20' fastening element
20a plate
20b, 20c side wall
20d transverse section
20e connection
21 groove
70, 70' pad-retaining spring
70a central section
70b, 70c transition section
71, 71' pressure section
72, 72' bearing section
72a rest section
75 lift pin
76 cotter pin
RS back side
ZS application side

What is claimed is:

1. A disc brake for a vehicle, comprising:
   a brake disc having a brake disc rotational axis;
   a brake carrier configured to straddle the brake disc;
   an application-side brake pad and a back-side brake pad with respective back plates configured to be supported directly on the brake carrier in respective brake carrier pad slots;
   a brake caliper configured to straddle the brake disc while being supported on the brake carrier in a manner that enables sliding of the brake caliper relative to the brake carrier along a direction parallel to the brake disc rotational axis;
   at least one pad-retaining spring coupled to the application side brake pad, wherein
the brake carrier and at least the application side brake pad have form-fitting complementary contours configured such that the form-fitting complementary contours directly abut one another when at least the application side brake pad is in an installed position in the brake carrier to constrain the application-side brake pad against radial movement away from the brake disc rotational axis, and
the at least one pad-retaining spring is configured to be supported at opposite ends directly on brake carrier horns adjacent to the application-side brake carrier pad slot and to exert a tensile force in a radially outward direction on the application-side brake pad.

2. The disc brake according to claim 1, wherein
the form-fitting complementary contours include opposing brake carrier projections into the application-side brake carrier pad slot and complementary recesses in opposite lateral sides of the application-side brake pad.

3. The disc brake according to claim 2, wherein
undercut surfaces of the contours of the brake carrier horns are configured to engage in a play-free manner undercut surfaces of projections of the pad back plate located radially inward of the brake pad recesses.

4. The disc brake according to claim 3, wherein
the at least one pad-retaining spring is located on an upper side of the application-side brake pad back plate.

5. The disc brake according to claim 4, wherein
the at least one pad-retaining spring includes a central section, arm sections adjacent to opposite ends of the central section, pressure sections adjacent to the arm sections, and transition sections between the central section and the adjacent arm sections, and
the central section is located on the upper side of the application-side pad back plate such that the transition sections contact the upper side of the application-side brake pad back plate and the pressure sections extend laterally beyond the lateral sides of the application-side brake pad back plate a distance sufficient to be supported on the brake carrier horns.

6. The disc brake according to claim 4, wherein
the at least one pad-retaining spring includes a central section, arm sections adjacent to opposite ends of the central section, pressure sections adjacent to the arm sections, and intermediate sections between the central section and the adjacent arm sections, and
the central section is attached to the application-side pad back plate by at least one fastening element and the pressure sections extend laterally beyond the lateral sides of the application-side brake pad back plate a distance sufficient to be supported on the brake carrier horns.

7. The disc brake according to claim 6, wherein
the at least one fastening element includes a transverse section extending through an opening in the application-side brake pad back plate and an upper section extending over the pad-retaining spring such that the pad-retaining spring passes between at least one fastening element and the upper side of the application-side brake pad back plate.

8. The disc brake according to claim 7, wherein
the pad-retaining spring has at least one aperture through which a side wall section of the at least one fastening element extends.

9. The disc brake according to claim 8, wherein
the pad-retaining spring has at least one further aperture through which a guide projection of the pad back plate extends.

10. The disc brake according to claim 3, wherein
the at least one pad-retaining spring includes a spring element at each of opposite lateral sides of the upper side of the application-side brake pad back plate, and
the spring elements at the opposite lateral sides are located on the application-side brake pad back plate and extend over their respective adjacent brake horns.

11. The disc brake of claim 10, wherein
the spring elements are located on the application-side brake pad back plate on respective spring holders of the back plate above the upper side of the back plate.

12. The disc brake of claim 11, wherein
the spring elements are held on their respective spring holders by respective retaining elements.

13. The disc brake of claim 12, wherein
the spring elements are formed from a spring wire material,
the retaining elements are rollers,
the spring elements are configured to be held in a pretensioned manner on upper side of the application-side brake pad back plate by their respective retaining elements, and
the spring elements extend laterally beyond the lateral sides of the application-side brake pad back plate a distance sufficient to be supported on the brake carrier horns.

14. The disc brake of claim 13, wherein
the pad-retaining springs each include a central section, transition sections at opposite ends of their respective central sections, a pressure section configured to be supported on the respective brake carrier horn and a bearing section configured to be supported on the upper side of the application-side brake pad back plate.

15. Brake pads for a sliding caliper disc brake, comprising:
an application-side brake pad including an application-side back plate;
a back-side brake pad including a back-side back plate; and
at least one pad-retaining spring on at least the application-side brake pad coupled to an upper side of the application-side brake pad back plate,
wherein
the application side brake pad back plate is operationally configured to cooperate with form-fitting complementary contours of a brake carrier such that the form-fitting complementary contours directly abut the application side brake pad back plate when the application side brake pad is in an installed position in the disc brake to constrain the application-side brake pad against movement in a radially outward direction relative to a brake disc rotational axis located radially inward of the brake carrier when the brake carrier is in an installed position in the disc brake, and
the at least one pad-retaining spring includes at least one pressure section extending laterally beyond a lateral side of the application-side brake pad back plate a distance sufficient to permit the at least one pressure section, when the application-side brake pad in an installed position on the disc brake, to be directly supported on a respective adjacent application-side brake carrier horn of the brake carrier such that the at least one pad-retaining spring exerts a tensile force in a radially outward direction on the installed application-side brake pad.

16. The brake pads for a sliding caliper disc brake of claim 15, wherein
the back-side brake pad back plate is operationally configured to cooperate with form-fitting complementary contours of the brake carrier to constrain the back-side brake pad against movement in the radially outward direction when the back-side brake pad is in an installed position in the disc brake,
the at least one pad-retaining spring includes a back-side pad-retaining spring coupled to the back-side brake pad, and
the back-side pad-retaining spring includes at least one pressure section corresponding to the at least one pressure section of the application-side pad-retaining spring, the at least one back-side pressure section being configured to be supported on a respective adjacent back-side brake carrier horn of the brake carrier such that the at least one back-side pad-retaining spring exerts a tensile force in a radially outward direction on the back-side brake pad when the back-side brake pad is in an installed position on the disc brake.

17. A disc brake for a vehicle, comprising:
a brake disc having a brake disc rotational axis;
a brake carrier configured to support a sliding brake caliper and to directly support application-side and back-side brake pads thereon;
tensioning means located on each of the application-side and back-side brake pads to bias the brake pads directly on the brake carrier in a radially outward direction when in installed positions on the brake carrier; and
constraining means configured such that the brake carrier directly abuts the application-side and back-side brake pads to constrain radially outward motion of the brake pads while allowing the brake pads to move axially on the brake carrier during brake application.

18. The disc brake of claim 17, wherein
the tensioning means include laterally-extending projections configured to cooperate with tensioning means support means of the brake carrier to bias the brake pads in the radially outward direction.

19. The disc brake of claim 18, further comprising:
fastening means for securing the tensioning means to each of the brake pads.

20. A disc brake for a vehicle, comprising:
a brake disc having a brake disc rotational axis;
a brake carrier configured to straddle the brake disc;
an application-side brake pad and a back-side brake pad with respective back plates configured to be supported directly on the brake carrier in respective brake carrier pad slots;
a brake caliper configured to straddle the brake disc while being supported on the brake carrier in a manner that enables sliding of the brake caliper relative to the brake carrier along a direction parallel to the brake disc rotational axis;
at least one pad-retaining spring coupled to the application side brake pad,
wherein
the brake carrier and at least the application side brake pad have form-fitting complementary contours configured such that the form-fitting complementary contours directly abut one another when at least the application side brake pad is in an installed position in the brake carrier to constrain the application-side brake pad against radial movement away from the brake disc rotational axis,
the at least one pad-retaining spring is configured to be supported at opposite ends directly on brake carrier horns adjacent to the application-side brake carrier pad slot and to exert a tensile force in a radially outward direction on the application-side brake pad,
the at least one pad-retaining spring includes a slot configured to receive a radially outward extending projection from the application-side brake pad back plate, and
the at least one pad-retaining spring is coupled to the application-side brake pad by a retaining element arranged above an upper surface of the at least one pad-retaining spring and engaging the back plate radially outward extending projection.

21. The disc brake of claim 20, wherein
the retaining element is a lift pin configured to pass through an eye of the back plate radially outward extending projection in a direction parallel to the brake disc rotation axis with the pad-retaining spring being captured between the lift pin and the upper surface of the application-side brake pad.

22. A method of installation of at least one radially-tensioned brake pad in a brake caliper of a vehicle disc brake, comprising the acts of:
installing at least an application-side brake pad into a brake pad slot of a brake pad carrier configured to directly support the application-side brake pad and the sliding caliper, wherein the application-side brake pad and the brake pad carrier have complementary form-fitting shapes configured such that the complementary form-fitting contours directly abut one another when at least the application side brake pad is in an installed position in the brake carrier to constrain motion of the application-side brake pad in a radially outward direction;
placing a brake pad tensioning element above an upper surface of a brake pad back plate of the application-side brake pad with opposite ends of the brake pad tensioning element being directly supported on surfaces of the brake pad carrier; and
coupling the brake pad tensioning element to the application-side brake pad back plate,
wherein the brake pad tensioning element and the brake pad carrier cooperate to apply a tensile force to the application-side brake pad in the direction away from the brake disc rotation axis.

23. The method of claim 22, wherein
the brake pad tensioning element is placed above and coupled to the application-side brake pad prior to installing the application-side brake pad into the brake pad carrier, and
the opposite ends of the brake pad tensioning element become supported on the brake pad carrier during the installation of the application-side brake pad into the brake pad carrier.

24. The method of claim 22, wherein
the brake pad tensioning element is a pad retaining spring, and
the brake pad tensioning element is coupled to the application-side brake pad back plate by at least one of welding, riveting and a fastening element.

25. The method of claim 24, wherein
the fastening element is at least one of at least one of a fastener and a retaining clamp arranged to engage a corresponding back plate fastening element receiving feature.

26. The method of claim 25, wherein
the back plate fastening element receiving feature is a through-hole in the back plate.

27. A method of installation of at least one radially-tensioned brake pad in a brake caliper of a vehicle disc brake, comprising the acts of:
  installing at least an application-side brake pad into a brake pad slot of a brake pad carrier configured to directly support the application-side brake pad and the sliding caliper, wherein the application-side brake pad and the brake pad carrier have complementary form-fitting shapes configured such that the form-fitting complementary contours directly abut one another when at least the application side brake pad is in an installed position in the brake carrier to constrain motion of the application-side brake pad in a direction away from a rotation axis of a brake disc of the disc brake;
  placing a brake pad tensioning element above an upper surface of a brake pad back plate of the application-side brake pad with opposite ends of the brake pad tensioning element being directly supported on surfaces of the brake pad carrier;
  pressing the brake pad tensioning element in a direction radially toward the brake disc rotation axis toward the upper surface of the application-side brake pad back plate a distance sufficient to permit installation of a brake pad tensioning element retainer; and
  engaging the brake pad tensioning element retainer with a corresponding retainer receiving feature of the application-side brake pad back plate,
  wherein the brake pad tensioning element, application-side brake pad upper surface, the brake pad carrier and the tensioning element retainer cooperate to apply a tensile force to the application-side brake pad in a direction radially away from the brake disc rotation axis.

28. The method of claim 27, wherein
the brake pad tensioning element is a pad retaining spring,
the brake pad tensioning element retainer is a lift pin,
the back plate retainer receiving feature is a projection of the back plate extending radially outward above the upper surface of the application-side brake pad back plate, and
the back plate projection is configured to receive and cooperate with the lift pin to restrain the pad retaining spring in a position above the back plate upper surface at which a predetermined spring preload is maintained.

29. The method of claim 28, wherein
the pad retaining spring includes a slot configured to permit the application-side brake pad back plate projection to pass through the pad retaining spring,
the application-side brake pad back plate projection is an eye sized to receive the lift pin, and
when installed in the eye at least one surface of the lift pin inhibits displacement of the pad retaining spring in the radially outward direction.

30. The method of claim 27, wherein
the application-side tensioning element and the tensioning element retainer are installed on the application-side brake pad prior to brake pad installing act.

31. The method of claim 27, wherein
the at least one radially-tensioned brake pad includes the application-side brake pad and a back-side brake pad.

32. The method of claim 31, wherein
the back-side brake pad is provided with a back-side tensioning element and installed in the disk brake by acts corresponding to the application-side brake pad installing, placing, pressing and engaging acts.

* * * * *